United States Patent
Hatanaka et al.

(10) Patent No.: US 9,577,264 B2
(45) Date of Patent: Feb. 21, 2017

(54) ALUMINUM BASE FOR CURRENT COLLECTOR, CURRENT COLLECTOR, POSITIVE ELECTRODE, NEGATIVE ELECTRODE, AND SECONDARY BATTERY

(71) Applicant: FUJIFILM Corporation, Minato-ku, Tokyo (JP)

(72) Inventors: Yusuke Hatanaka, Haibara-gun (JP); Satoshi Hoshi, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 172 days.

(21) Appl. No.: 14/019,018

(22) Filed: Sep. 5, 2013

(65) Prior Publication Data
US 2014/0004420 A1    Jan. 2, 2014

Related U.S. Application Data

(63) Continuation of application No. PCT/JP2012/057033, filed on Mar. 19, 2012.

(30) Foreign Application Priority Data

Mar. 29, 2011  (JP) ................................. 2011-072626

(51) Int. Cl.
*H01M 4/66*  (2006.01)
*H01M 4/131*  (2010.01)
(Continued)

(52) U.S. Cl.
CPC ............. *H01M 4/661* (2013.01); *H01M 4/131* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

| 7,655,341 | B2 * | 2/2010 | Strobel | H01M 8/0254 429/439 |
| 2006/0099481 | A1 * | 5/2006 | Ji | H01M 8/0221 429/457 |

(Continued)

FOREIGN PATENT DOCUMENTS

| CN | 101507022 A | 8/2009 |
| JP | 11-016575 A | 1/1999 |

(Continued)

OTHER PUBLICATIONS

International Search Report, PCT/JP2012/057033 Jun. 19, 2013, 5 pages in English and Japanese.
International Preliminary Report on Patentability and Written Opinion, mailed Oct. 10, 2013, issued in corresponding International Application No. PCT/JP2012/057033, 6 pages in English.
(Continued)

*Primary Examiner* — Miriam Stagg
*Assistant Examiner* — Carmen Lyles-Irving
(74) *Attorney, Agent, or Firm* — Sughrue Mion, PLLC

(57) ABSTRACT

The purpose of this invention is to provide an aluminum base for a current collector, which enables the production of a secondary battery having excellent cycle properties; and a current collector, a positive electrode, a negative electrode and a secondary battery, each of which is produced using the aluminum base. The aluminum base for a current collector has a surface in which at least two structures selected from the group consisting of a large-wave structure having an average opening size of more than 5 μm but up to 100 μm, a medium-wave structure having an average opening size of more than 0.5 μm but up to 5 μm, and a small-wave structure having an average opening size of more than 0.01 μm but up to 0.5 μm are superimposed on one another, wherein a maximum peak-to-valley height Pt of a profile curve of the surface is up to 10 μm.

20 Claims, 4 Drawing Sheets

(51) Int. Cl.
*H01M 4/505* (2010.01)
*H01M 4/525* (2010.01)
*H01M 4/70* (2006.01)
*H01M 10/052* (2010.01)

(52) U.S. Cl.
CPC .............. *H01M 4/667* (2013.01); *H01M 4/70* (2013.01); *H01M 10/052* (2013.01); *Y02E 60/122* (2013.01); *Y02T 10/7011* (2013.01)

(56) References Cited

U.S. PATENT DOCUMENTS

2006/0134520 A1* 6/2006 Ishii et al. .................... 429/223
2009/0280407 A1* 11/2009 Ito et al. ....................... 429/209

FOREIGN PATENT DOCUMENTS

| JP | 2003-051313 A | 2/2003 |
| JP | 2005-002371 A | 1/2005 |
| JP | 2008-010419 A | 1/2008 |
| JP | 2008-282797 A | 11/2008 |

OTHER PUBLICATIONS

First Office Action, dated Jun. 15, 2015, issued in corresponding CN Application No. 201280016077.7, 14 pages in English and Chinese.
Communication dated Nov. 11, 2015 from the Taiwan Intellectual Property Office in counterpart application No. 101110677, 8 pages in Chinese and English.

\* cited by examiner

ALUMINUM BASE FOR CURRENT COLLECTOR, CURRENT COLLECTOR, POSITIVE ELECTRODE, NEGATIVE ELECTRODE, AND SECONDARY BATTERY

TECHNICAL FIELD

The present invention relates to an aluminum base for a current collector, and the current collector, a positive electrode, a negative electrode and a secondary battery using the aluminum base.

BACKGROUND OF THE INVENTION

In recent years, with the development of portable devices such as personal computers and cellular phones as well as hybrid vehicles, electric vehicles and the like, there is an increasing demand for secondary batteries (particularly lithium secondary batteries) as their power supplies.

It is known that a foil-shaped aluminum base is used as the current collector for electrodes (hereinafter referred to simply as "current collector") that may be used in the positive electrode or the negative electrode of such a secondary battery.

It is known that a low adhesion of the current collector to a layer containing an active material (hereinafter also referred to as "active material layer") in the positive electrode or the negative electrode of the second battery causes the active material to come off the current collector during charge/discharge to adversely affect the battery characteristics.

Techniques for roughening the surfaces of aluminum bases have been proposed in order to improve the adhesion between current collectors and active materials (see, for example, JP 11-16575 A, JP 2003-51313 A, JP 2005-2371 A, JP 2008-10419 A and JP 2008-282797 A).

SUMMARY OF INVENTION

The inventors of the invention have made a study on the current collectors (metal foil, aluminum foil) described in JP 11-16575 A, JP 2003-51313 A, JP 2005-2371 A, JP 2008-10419 A and JP 2008-282797 A and as a result found that they do not have enough adhesion to their corresponding active material layers and may be inferior in battery characteristics and in particular cycle characteristics.

Accordingly, the present invention aims at providing an aluminum base for a current collector capable of manufacturing a secondary battery having excellent cycle characteristics as well as the current collector, a positive electrode, a negative electrode and the secondary battery using the aluminum base.

The inventors of the invention have made an intensive study to achieve the foregoing object and as a result found that a secondary battery having excellent cycle characteristics can be manufactured by using, as the current collector, an aluminum base having a surface in which two or more types of wave structures having specific average opening sizes, respectively, are superimposed on one another. The invention has been thus completed.

Specifically, the invention provides the following (1) to (14).

(1) An aluminum base for a current collector, comprising: a surface in which at least two structures selected from the group consisting of a large-wave structure having an average opening size of more than 5 µm but up to 100 µm, a medium-wave structure having an average opening size of more than 0.5 µm but up to 5 µm, and a small-wave structure having an average opening size of more than 0.01 µm but up to 0.5 µm are superimposed on one another, wherein a maximum peak-to-valley height Pt of a profile curve of the surface is up to 10 µm.

(2) The aluminum base for the current collector according to (1), having a surface area ratio $\Delta S$ of 20% or more and a steep area ratio a45 of 5 to 60%, the surface area ratio $\Delta S$ being a value obtained by formula (i):

$$\Delta S=(S_x-S_0)/S_0\times 100(\%) \quad (i)$$

where $S_x$ is an actual area of 50 µm square surface regions as determined by three-point approximation from three-dimensional data on the surface regions measured with an atomic force microscope at 512×512 points and $S_0$ is a geometrically measured area, and the steep area ratio a45 being an area ratio of portions inclined at an angle of 45° or more (having an inclination of 45° or more) to the actual area $S_x$.

(3) The aluminum base for the current collector according to (1) or (2), having the surface in which at least the large-wave structure is formed.

(4) The aluminum base for the current collector according to any one of (1) to (3), having the surface in which all of the large-wave structure, the medium-wave structure and the small-wave structure are superimposed on one another.

(5) The aluminum base for the current collector according to any one of (1) to (4), having a thickness of less than 100 µm.

(6) A current collector comprising: the aluminum base for the current collector according to any one of (1) to (5).

(7) A positive electrode comprising: a positive electrode current collector using the current collector according to (6) for the positive electrode and a layer containing a positive electrode active material and formed on a surface of the positive electrode current collector.

(8) The positive electrode according to (7), wherein the positive electrode active material is a material capable of storing and releasing lithium.

(9) The positive electrode according to (7) or (8), wherein the positive electrode active material is a composite oxide containing lithium and a transition metal.

(10) The positive electrode according to (9), wherein the positive electrode active material is lithium cobaltate (LiCoO$_2$).

(11) A negative electrode comprising: a negative electrode current collector using the current collector according to (6) for the negative electrode and a layer containing a negative electrode active material and formed on a surface of the negative electrode current collector.

(12) The negative electrode according to (11), wherein the negative electrode active material is a material capable of storing and releasing lithium and having a lithium ion-storing and releasing potential of 0.4 V or more with respect to a lithium metal potential.

(13) The negative electrode according to (12), wherein the negative electrode active material is lithium titanate.

(14) A secondary battery comprising: a positive electrode, a negative electrode and an electrolyte, wherein the positive electrode is the positive electrode according to any one of (7) to (10) and/or the negative electrode is the negative electrode according to any one of (11) to (13).

As will be described later, the invention can provide an aluminum base for a current collector capable of manufacturing a secondary battery having excellent cycle characteristics as well as the current collector, a positive electrode, a negative electrode and the secondary battery using the aluminum base.

DESCRIPTION OF EMBODIMENTS

[Aluminum Base for Current Collector]

Figure 1:
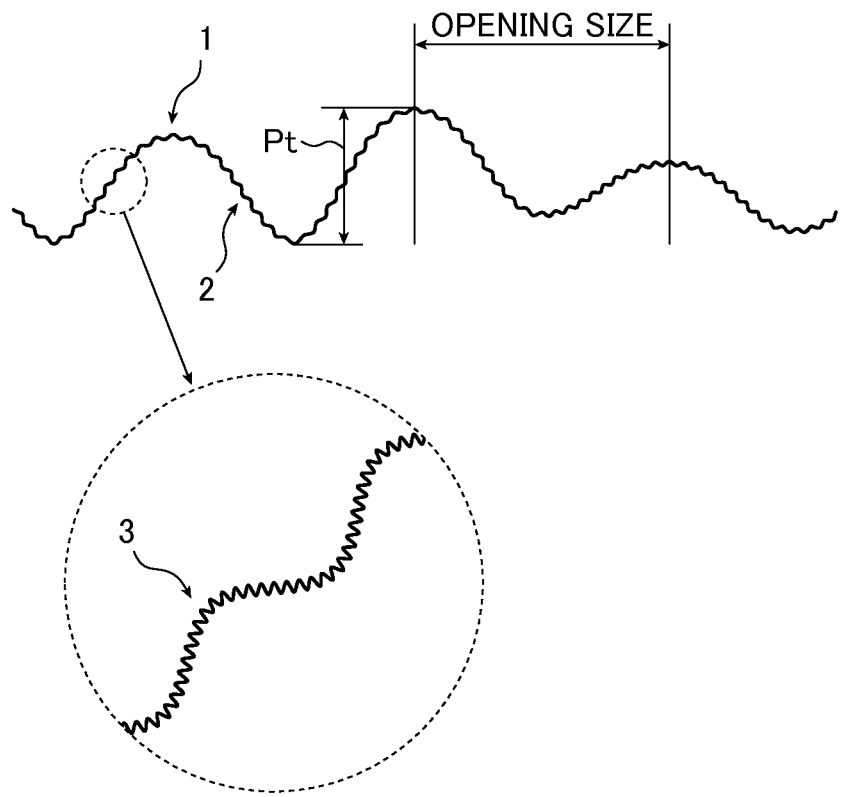
FIG. 1 is a schematic cross-sectional view illustrating the surface profile of an aluminum base for a current collector according to the invention.

The aluminum base for a current collector according to the invention (hereinafter also referred to as "aluminum base of the invention") is an aluminum base having a surface in which two or more types of wave structures having specific average opening sizes, respectively, are superimposed on one another.

The surface profile and the manufacturing method of the aluminum base of the invention are described below in detail.

[Surface Profile]

The aluminum base of the invention has a surface in which at least two structures selected from the group consisting of a large-wave structure having an average opening size of more than 5 μm but up to 100 μm, a medium-wave structure having an average opening size of more than 0.5 μm but up to 5 μm, and a small-wave structure having an average opening size of more than 0.01 μm but up to 0.5 μm are superimposed on one another.

By having such a surface profile, the area of contact between the current collector of the invention to be described later and the active material layer is increased to enhance the adhesion, whereby a secondary battery having excellent cycle characteristics can be manufactured.

This is presumably because the large-wave structure and/or the medium-wave structure ensures the adhesion to the active material making up the active material layer, while the medium-wave structure and/or the small-wave structure ensures the adhesion to an optional ingredient (e.g., a conductive aid) making up the active material layer.

The methods for measuring the average opening sizes of the large-wave structure, the medium-wave structure and the small-wave structure are as follows:

(1) Average Opening Size of Large-Wave Structure (Average Wavelength)

Two-dimensional roughness measurement is carried out using a stylus-type roughness tester. The mean spacing between profile peaks $S_m$ as defined by ISO 4287 is measured five times, and the mean of the five measurements is used as the value of the average opening size.

(2) Average Opening Size of Medium-Wave Structure (Average Wavelength)

The surface of the aluminum base is photographed from just above with a high-resolution scanning electron microscope (SEM) at a magnification of 2,000×. From the image obtained by the SEM, at least 50 pits (asperities) of the medium-wave structure which forms the annular periphery are selected and their diameter is read for the opening size. The average opening size is then calculated.

(3) Average Opening Size of Small-Wave Structure (Average Wavelength)

The surface of the aluminum base is photographed from just above with a high-resolution scanning electron microscope (SEM) at a magnification of 50,000×. From the image obtained by the SEM, at least 50 pits (asperities) of the small-wave structure are selected and their diameter is read for the opening size. The average opening size is then calculated.

In the practice of the invention, the large-wave structure preferably has an average opening size of 7 to 75 μm and more preferably 10 to 50 μm because the area of contact with the active material layer is increased to enhance the adhesion, thus enabling the manufacture of a secondary battery having more excellent cycle characteristics.

The medium-wave structure preferably has an average opening size of 0.7 to 4 μm and more preferably 1 to 3 μm because an optional ingredient (e.g., an conductive aid) making up the active material layer penetrates openings (valleys) to increase the area of contact with the active material layer, thereby reducing the contact resistance.

In addition, the small-wave structure preferably has an average opening size of 0.015 to 0.4 μm and more preferably 0.02 to 0.3 μm because the actual surface area over which the aluminum base surface functions as the conductive surface of the current collector is increased.

The surface of the aluminum base of the invention has at least two selected from the group consisting of the above-described large-wave structure, medium-wave structure and small wave structure. However, the surface of the aluminum base is preferably formed by superimposing the large-wave structure, and the medium-wave structure and/or the small-wave structure on one another because the area of contact is increased to enhance the adhesion, whereby the manufactured secondary battery has good rate characteristics. In addition, the surface of the aluminum base is more preferably formed by superimposing all of the large-wave structure, the medium-wave structure and the small-wave structure on one another because the area of contact with the active material layer is increased to enhance the adhesion, thus enabling the manufacture of a secondary battery having more excellent cycle characteristics and rate characteristics.

The embodiment in which the large-wave structure, the medium-wave structure and the small-wave structure are all superimposed on one another is now described with reference to FIG. 1.

As shown in FIG. 1, a large-wave structure 1, a medium-wave structure 2 and a small-wave structure 3 each form a substantially sinusoidal wave profile and form a substantially sinusoidal wave profile of the large-wave structure as a whole.

The maximum peak-to-valley height Pt of the profile curve of the surface of the aluminum base of the invention is up to 10 μm and preferably 1 to 8 μm.

The maximum peak-to-valley height Pt as used herein refers to a "maximum peak-to-valley height of a profile curve" as defined by JIS B 0601:2001 (see FIG. 1).

At a maximum peak-to-valley height Pt of up to 10 μm, the manufactured secondary battery has a longer discharge life as compared to cases where the maximum peak-to-valley height exceeds 10 μm. This is presumably because this depth is suitable for optional ingredients (e.g., a conductive aid and a binding agent) in the active material layer to hold the adhesion to the current collector and to exhibit good electrical conductivity.

The aluminum base of the invention preferably has a surface area ratio ΔS of at least 20% and a steep area ratio a45 of 5 to 60%, more preferably has a surface area ratio ΔS of at least 35% and a steep area ratio a45 of 8 to 50%, and even more preferably has a surface area ratio ΔS of at least 50% and a steep area ratio a45 of 10 to 40%.

The surface area ratio ΔS is a value obtained by formula (i):

$$\Delta S = (S_x - S_0)/S_0 \times 100 (\%) \quad (i)$$

where $S_x$ is an actual area of 50 μm square surface regions as determined by three-point approximation from three-dimensional data on the surface regions measured with an atomic force microscope at 512×512 points and $S_0$ is a geometrically measured area, and the steep area ratio a45 is an area ratio of portions inclined at an angle of 45° or more (having an inclination of 45° or more) to the actual area $S_x$.

The surface area ratio ΔS is one of the factors that show the frequency of the wave structures (mainly the large-wave structure) at the surface of the aluminum base of the invention. The steep area ratio a45 is a factor that shows how steep the wave structures (mainly the large-wave structure) at the surface of the aluminum base of the invention are.

The surface area ratio ΔS of at least 20% and a steep area ratio a45 of 5 to 60% increase the area of contact with the active material layer to enhance the adhesion, whereby a secondary battery having more excellent cycle characteristics and good rate characteristics can be manufactured.

In the practice of the invention, the surface profile is measured with the atomic force microscope (AFM) to obtain three-dimensional data to thereby determine the surface area ratio ΔS and the steep area ratio a45. The measurement can be carried out, for example, under the following conditions.

That is, a 1 cm square sample is cut out from the aluminum base and placed on a horizontal sample holder on a piezo scanner. A cantilever is made to approach the surface of the sample. When the cantilever reaches the zone where interatomic forces are appreciable, the surface of the sample is scanned in the X and Y directions and the surface profile (wave structures) of the sample is read based on the displacement in the Z direction on the piezo scanner. A piezo scanner capable of scanning 150 μm in the X and Y directions and 10 μm in the Z direction is used. A cantilever having a resonance frequency of 120 to 150 kHz and a spring constant of 12 to 20 N/m (e.g., SI-DF20 manufactured by NANOPROBE) is used, with measurement being carried out in the dynamic force mode (DFM). The three-dimensional data obtained is approximated by the least-squares method to compensate for slight tilting of the sample and determine a reference plane. Measurement involves obtaining values of 50 μm square regions on the surface of the sample at 512 by 512 points. The resolution is 1.9 μm in the X and Y directions, and 1 nm in the Z direction. The scan rate is 60 μm/s.

Using the three-dimensional data (f(x,y)) obtained above, sets of adjacent three points are selected and the surface areas of microtriangles formed by the sets of three points are summated, thereby giving the actual area $S_x$. The surface area ratio ΔS is calculated from the resulting actual area $S_x$ and the geometrically measured area $S_0$ using formula (I) above.

The three-dimensional data (f(x,y)) obtained above is used to calculate for each reference point an angle formed between the reference plane and a microtriangle formed by three points including each reference point and its adjacent two points in predetermined directions (e.g., on the right side and the lower side). The number of reference points having a microtriangle inclination of 45° or more is divided by the total number of reference points (number obtained by subtracting the number of reference points having no adjacent two points in predetermined directions from the total data number (512×512), in short, 511×511) to calculate the area ratio a45 of the portions having an inclination of 45° or more.

[Manufacturing Method]

The method of manufacturing the aluminum base of the invention is not particularly limited and the aluminum base can be obtained, for example, by subjecting aluminum foil to surface treatment including surface roughening treatment.

<Aluminum Foil>

A known type of aluminum foil may be used to manufacture the aluminum base of the invention.

The aluminum foil that may be used in the invention is metal foil containing aluminum as its main ingredient. For example, use may be made of aluminum foil having alloy numbers of 1085, 1N30 and 3003 as defined in JIS H4000.

The aluminum foil that may be used in the invention preferably has a thickness of up to 100 μm, more preferably 5 to 80 μm, and even more preferably 10 to 50 μm. This thickness can be appropriately changed according to the desires of users.

<Surface Treatment>

If the surface treatment in manufacturing the aluminum base of the invention includes at least surface roughening, the surface treatment may include various other steps than the surface roughening.

Typical methods for forming the above-described surface profile include a method in which aluminum foil is subjected, in order, to alkali etching treatment, desmutting treatment using an acid and electrochemical graining treatment using an electrolytic solution; and a method in which alkali etching treatments, desmutting treatments using an acid and electrochemical graining treatments using different electrolytic solutions are performed on aluminum foil. However, the invention is not limited thereto. In these methods, electrochemical graining treatment may be further followed by alkali etching treatment and desmutting treatment with an acid.

More specifically, although the conditions of other treatments such as alkali etching treatment may influence, in order to form a surface profile in which the medium-wave structure is superimposed on the large-wave structure, use may be advantageously made of a method which involves performing electrochemical graining treatment using a nitric acid-based electrolytic solution at a reduced frequency and then performing electrochemical graining treatment using a nitric acid-based electrolytic solution at an increased frequency; and a method which involves only performing electrochemical graining treatment using a nitric acid-based electrolytic solution with an increased total amount of electricity furnished to the anodic reaction to form the large-wave structure and the medium-wave structure at a time.

In order to form a surface profile in which the small-wave structure is superimposed on the large-wave structure, use may be advantageously made of a method which involves performing electrochemical graining treatment using a nitric acid-based electrolytic solution at a reduced frequency and then performing electrochemical graining treatment using a hydrochloric acid-based electrolytic solution; and a method which involves only performing electrochemical graining treatment using a hydrochloric acid-based electrolytic solution with an increased total amount of electricity furnished to the anodic reaction to form the large-wave structure and the small-wave structure at a time.

In order to form a surface profile in which the small-wave structure is superimposed on the medium-wave structure, use may be advantageously made of a method which involves performing electrochemical graining treatment using a nitric acid-based electrolytic solution at a higher frequency and with a larger amount of electricity and then performing electrochemical graining treatment using a hydrochloric acid-based electrolytic solution.

In order to form a surface profile in which the small-wave structure is superimposed on the medium-wave structure, which is in turn superimposed on the large-wave structure, use may be advantageously made of, for example, a method which involves performing the above-described method to form a surface profile in which the medium-wave structure is superimposed on the large-wave structure, and then performing electrochemical graining treatment using a hydrochloric acid-based electrolytic solution.

The respective surface treatment steps are described below in detail.

(Electrochemical Graining Treatment)

Electrochemical graining treatment (hereinafter also referred to as "electrolytic graining treatment") may be carried out with an electrolytic solution of the type employed in conventional electrochemical graining treatment using an alternating current. In particular, the use of an electrolytic solution containing primarily hydrochloric acid or nitric acid enables the surface profile as described above to be readily obtained and is therefore preferable.

Electrolytic graining treatment may be carried out in accordance with, for example, the electrochemical graining process (electrolytic graining process) described in JP 48-28123 B and GB 896,563. A sinusoidal alternating current is used in the electrolytic graining process but special waveforms described in JP 52-58602 A may also be used. Use may also be made of the waveforms described in JP 3-79799 A. Other processes that may be employed for this purpose include those described in JP 55-158298 A, JP 56-28898 A, JP 52-58602 A, JP 52-152302 A, JP 54-85802 A, JP 60-190392 A, JP 58-120531 A, JP 63-176187 A, JP 1-5889 A, JP 1-280590 A, JP 1-118489 A, JP 1-148592 A, JP 1-178496 A, JP 1-188315 A, JP 1-154797 A, JP 2-235794 A, JP 3-260100 A, JP 3-253600 A, JP 4-72079 A, JP 4-72098 A, JP 3-267400 A and JP 1-141094 A. In addition to the above, electrolytic graining treatment may also be carried out using alternating currents of special frequency such as have been proposed in connection with methods for manufacturing electrolytic capacitors. These are described in, for example, JP 58-207400 A, U.S. Pat. No. 4,276,129 and U.S. Pat. No. 4,676,879.

Various electrolytic cells and power supplies have been proposed for use in electrochemical graining treatment. For example, use may be made of those described in U.S. Pat. No. 4,203,637, JP 56-123400 A, JP 57-59770 A, JP 53-12738 A, JP 53-32821 A, JP 53-32822 A, JP 53-32823 A, JP 55-122896 A, JP 55-132884 A, JP 62-127500 A, JP 1-52100 A, JP 1-52098 A, JP 60-67700 A, JP 1-230800 A, JP 3-257199 A, JP 52-58602 A, JP 52-152302 A, JP 53-12738 A, JP 53-12739 A, JP 53-32821 A, JP 53-32822 A, JP 53-32833 A, JP 53-32824 A, JP 53-32825 A, JP 54-85802 A, JP 55-122896 A, JP 55-132884 A, JP 48-28123 B, JP 51-7081 B, JP 52-133838 A, JP 52-133840 A, JP 52-133844 A, JP 52-133845 A, JP 53-149135 A and JP 54-146234 A.

In addition to nitric acid and hydrochloric acid solutions, other acidic solutions that may be used for the electrolytic solution include the electrolytic solutions mentioned in U.S. Pat. Nos. 4,671,859, 4,661,219, 4,618,405, 4,600,482, 4,566,960, 4,566,958, 4,566,959, 4,416,972, 4,374,710, 4,336,113 and 4,184,932.

The acidic solution has a concentration of preferably 0.5 to 2.5 wt %, although a concentration of 0.7 to 2.0 wt % is especially preferred for use in desmutting treatment mentioned above. The electrolytic solution preferably has a temperature of 20 to 80° C. and more preferably 30 to 60° C.

The aqueous solution composed primarily of hydrochloric acid or nitric acid may be obtained by dissolving at least one of a nitrate ion-containing nitrate compound such as aluminum nitrate, sodium nitrate or ammonium nitrate and a chloride ion-containing chloride compound such as aluminum chloride, sodium chloride or ammonium chloride to a concentration of from 1 g/L to saturation in a 1 to 100 g/L solution of hydrochloric acid or nitric acid in water. Metals which are present in the aluminum alloy, such as iron, copper, manganese, nickel, titanium, magnesium and silica may be dissolved in the aqueous solution composed primarily of hydrochloric acid or nitric acid. It is preferable to use a solution prepared by dissolving a compound such as aluminum chloride or aluminum nitrate to an aluminum ion concentration of 3 to 50 g/L in a 0.5 to 2 wt % solution of hydrochloric acid or nitric acid in water.

In addition, by adding and using a compound capable of forming a complex with copper, uniform graining may be carried out even on aluminum foil having a high copper content. Examples of the compound capable of forming a complex with copper include ammonia; amines obtained by substituting the hydrogen atom on ammonia with a hydrocarbon group (of an aliphatic, aromatic, or other nature), such as methylamine, ethylamine, dimethylamine, diethylamine, trimethylamine, cyclohexylamine, triethanolamine, triisopropanolamine and ethylenediaminetetraacetic acid (EDTA); and metal carbonates such as sodium carbonate, potassium carbonate and potassium hydrogencarbonate. Additional compounds suitable for this purpose include ammonium salts such as ammonium nitrate, ammonium chloride, ammonium sulfate, ammonium phosphate and ammonium carbonate. The temperature is preferably in a range of 10 to 60° C. and more preferably 20 to 50° C.

Figure 2:
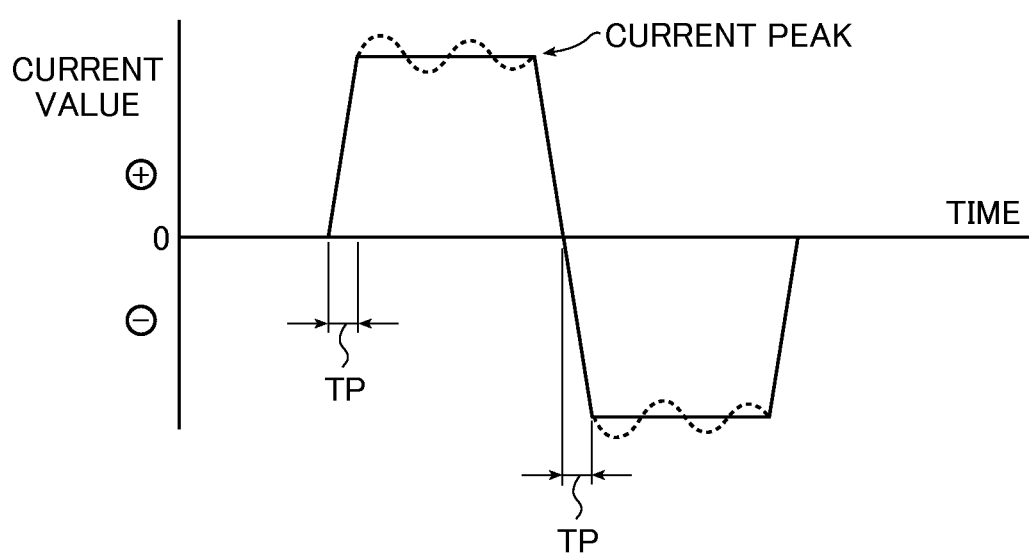
FIG. 2 is a graph showing an example of an alternating current waveform that may be used to perform electrochemical graining treatment in the manufacture of the aluminum base for a current collector according to the invention.

No particular limitation is imposed on the alternating current waveform used in electrochemical graining treatment. For example, a sinusoidal, square, trapezoidal or triangular waveform may be used, but a square or trapezoidal waveform is preferred and a trapezoidal waveform is particularly preferred. "Trapezoidal waveform" refers herein to such a waveform as shown in FIG. 2. In the trapezoidal waveform, the time TP in which the current value changes from zero to a peak is preferably 1 to 3 ms. If the time is less than 1 ms, treatment unevenness called "chatter mark" may readily occur perpendicularly to the direction of travel of the aluminum foil. If the time TP exceeds 3 ms, the process tends to be affected by trace ingredients in the electrolytic solution as typified by ammonium ions that spontaneously increase during electrolytic treatment, making it difficult to carry out uniform graining.

Alternating current having a trapezoidal waveform and a duty ratio of 1:2 to 2:1 may be used. However, as described in JP 5-195300 A, in an indirect power feed system that does not use a conductor roll to feed current to the aluminum, a duty ratio of 1:1 is preferred. Alternating current having a trapezoidal waveform and a frequency of 0.1 to 120 Hz may be used, although a frequency of 50 to 70 Hz is preferable from the standpoint of the equipment. At a frequency lower than 50 Hz, the carbon electrode serving as the main electrode is more likely to dissolve. On the other hand, at a frequency higher than 70 Hz, the power supply circuit is more likely to be affected by inductance components thereon, increasing the power supply costs.

Figure 3:
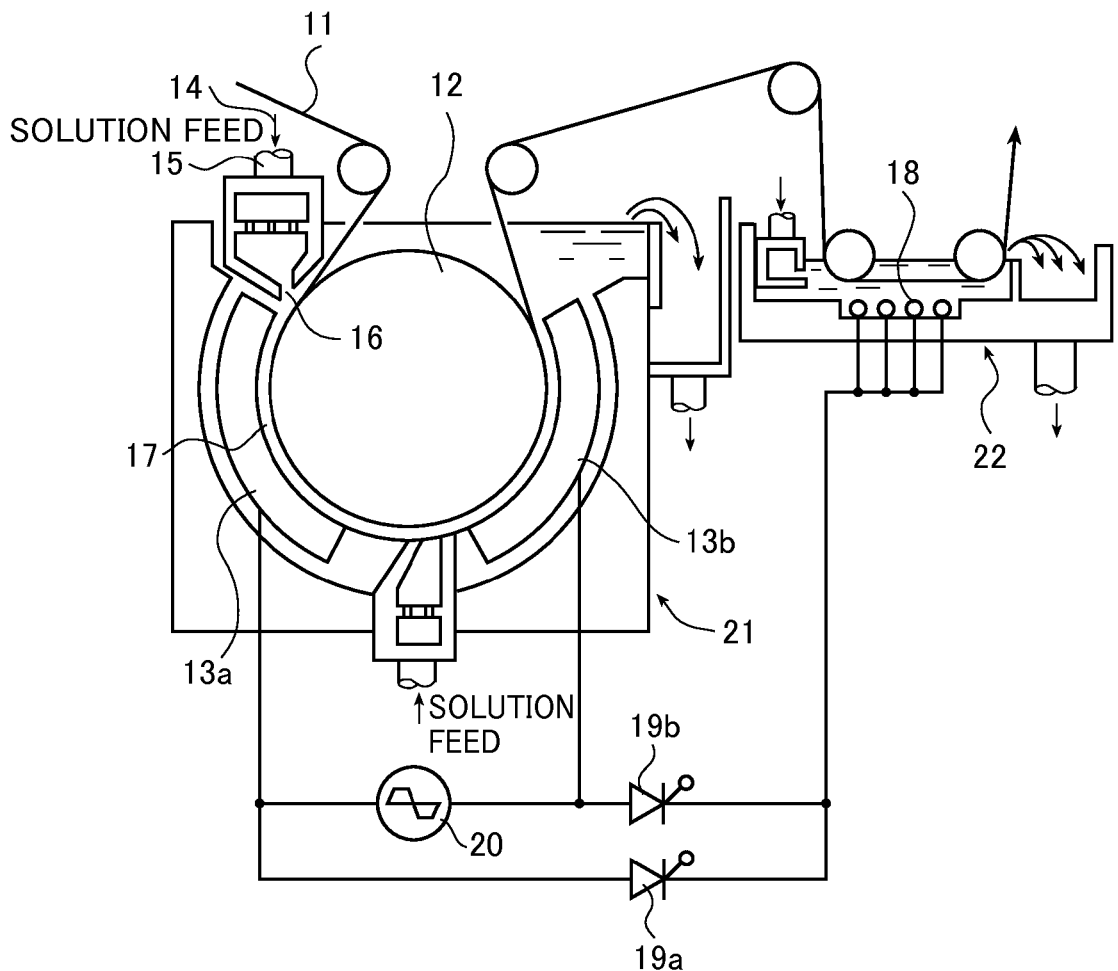
FIG. 3 is a schematic view showing an example of a radial electrolytic cell in electrochemical graining treatment with alternating current in the manufacture of the aluminum base for a current collector according to the invention.

One or more AC power supplies may be connected to the electrolytic cell. To control the anode/cathode current ratio of the alternating current applied to the aluminum foil opposite to the main electrodes and thereby carry out uniform graining and to dissolve carbon from the main electrodes, it is advantageous to provide an auxiliary anode and divert part of the alternating current as shown in FIG. 3. FIG. 3 shows aluminum foil 11, a radial drum roller 12, main electrodes 13a and 13b, an electrolytic treatment solution 14, an electrolytic solution feed inlet 15, a slit 16, an electrolytic solution channel 17, an auxiliary anode 18, thyristors 19a and 19b, an AC power supply 20, a main electrolytic cell 21 and an auxiliary anode cell 22. By using a rectifying or switching device to divert some of the current as direct current to the auxiliary anode provided in a separate cell from that containing the two main electrodes, it is possible to control the ratio between the current furnished for the anodic reaction which acts on the aluminum foil facing the main electrodes and the current furnished for the cathodic reaction. The ratio between the amount of electricity furnished to the cathodic reaction and the amount of electricity furnished to the anodic reaction on the aluminum foil opposite to the main electrodes (ratio of the amount of electricity when the aluminum foil serves as an cathode to that when the aluminum foil serves as an anode) is preferably 0.3 to 0.95.

Any known electrolytic cell employed for surface treatment, including vertical, flat and radial type electrolytic cells, may be used but radial type electrolytic cells such as those described in JP 5-195300 A are especially preferred. The electrolytic solution is passed through the electrolytic cell either parallel or counter to the direction of travel of the aluminum web.

(Nitric Acid Electrolysis)

A medium-wave structure having an average opening size of more than 0.5 µm but up to 5 µm can be formed by electrochemical graining treatment using an electrolytic solution composed primarily of nitric acid. When the amount of electricity is made relatively large, the electrolytic reaction concentrates, resulting in the formation of a large-wave structure having a wavelength larger than 5 µm as well.

To obtain such a surface profile, the total amount of electricity furnished to the anodic reaction on the aluminum foil up until completion of the electrolytic reaction is preferably 1 to 1,000 $C/dm^2$, and more preferably 50 to 300 $C/dm^2$. The current density at this time is preferably 20 to 100 $A/dm^2$.

For example a small-wave structure having an average wavelength of 0.20 µm or less may also be formed by performing electrolysis at a temperature of 30 to 60° C. with a high-concentration electrolytic solution of nitric acid having a nitric acid concentration of 15 to 35 wt % for example, or by performing electrolysis at a high temperature (e.g., 80° C. or higher) with an electrolytic solution of nitric acid having a nitric acid concentration of 0.7 to 2 wt %. As a result, $\Delta S$ can have a larger value.

(Hydrochloric Acid Electrolysis)

Hydrochloric acid by itself has a strong ability to dissolve aluminum, and therefore a fine small-wave structure can be formed at the surface with the application of just a slight degree of electrolysis. The fine small-wave structure has an average opening size of more than 0.01 µm but up to 0.5 µm, and arises uniformly over the entire surface of the aluminum foil.

To obtain such a surface profile, the total amount of electricity furnished to the anodic reaction on the aluminum foil up until completion of the electrolytic reaction is preferably 1 to 100 $C/dm^2$, and more preferably 20 to 70 $C/dm^2$. The current density at this time is preferably 20 to 50 $A/dm^2$.

In such electrochemical graining treatment with an electrolytic solution composed primarily of hydrochloric acid, by furnishing a large total amount of electricity of 400 to 2,000 $C/dm^2$ to the anodic reaction, large crater-like undulations can also be formed at the same time. In this case, the fine small-wave structure having an average opening size of more than 0.01 µm but up to 0.5 µm is formed over the entire surface in such a state that the fine small-wave structure is superimposed on the large-wave structure having an average opening size of more than 5 µm but up to 100 µm. In this case, the medium-wave structure having an average opening size of more than 0.5 µm but up to 5 µm is not formed.

It is effective to form a multiplicity of small wave-large structure portions at the surface in order to have a larger $\Delta S$ value. Methods that may be appropriately used to form a multiplicity of small-wave structure portions at the surface as described above include electrolytic graining treatment using an electrolytic solution composed primarily of hydrochloric acid, and electrolytic graining treatment using a high-concentration and high-temperature electrolytic solution composed primarily of nitric acid.

It is preferable for the aluminum foil to be subjected to cathodic electrolysis before and/or after electrolytic graining treatment in the nitric acid- or hydrochloric acid-containing electrolytic solution as described above. Such cathodic electrolysis gives rise to smut formation on the surface of the aluminum foil and hydrogen gas evolution, which enables more uniform electrolytic graining treatment to be achieved.

Cathodic electrolysis is carried out in an acidic solution with electricity applied to the cathode in an amount of preferably 3 to 80 $C/dm^2$, and more preferably 5 to 30 $C/dm^2$. When the amount of electricity applied to the cathode is less than 3 $C/dm^2$, the amount of smut deposition may be inadequate. On the other hand, when the amount of electricity exceeds 80 $C/dm^2$, the amount of smut deposition may be excessive. The electrolytic solution may be the same as or different from the one used in electrolytic graining treatment.

(Alkali Etching Treatment)

Alkali etching is a treatment in which the surface layer of the above-described aluminum foil is brought into contact with an alkali solution and dissolved.

The purpose of carrying out alkali etching treatment prior to electrolytic graining treatment is to remove substances such as rolling oils, contaminants and a natural oxide film from the surface of the aluminum foil.

The amount of material removed by alkali etching (hereinafter also referred to as "amount of etching") is preferably from 0.05 to 10 $g/m^2$ and more preferably from 1 to 5 $g/m^2$.

When the amount of etching is less than 0.05 g/m², substances such as rolling oils, contaminants and a natural oxide film on the surface may remain to hinder the formation of uniform wave structures in the subsequent electrolytic graining treatment, thus causing unevenness. On the other hand, when the amount of etching is 1 to 10 g/m², the sufficient removal of substances such as rolling oils, contaminants and a natural oxide film on the surface will take place. An amount of etching exceeding the above range is economically undesirable.

The purpose of carrying out alkali etching treatment immediately after electrolytic graining treatment is to dissolve smut that has been formed in the acidic electrolytic solution and to dissolve the edge areas of wave structure portions that have been formed by electrolytic graining treatment. The wave structures that are formed by electrolytic graining treatment vary depending on the type of electrolytic solution used, so the optimal amount of etching also varies. However, the amount of etching in alkali etching treatment carried out after electrolytic graining treatment is preferably 0.1 to 5 g/m². When a nitric acid electrolytic solution is used, it is necessary to set the amount of etching somewhat larger than that when a hydrochloric acid electrolytic solution is used. If electrolytic graining treatment is carried out a plurality of times, alkali etching may be carried out as needed after each electrolytic graining treatment.

Alkalis that may be used in the alkali solution are exemplified by caustic alkalis and alkali metal salts. Specific examples of suitable caustic alkalis include sodium hydroxide and potassium hydroxide. Specific examples of suitable alkali metal salts include alkali metal silicates such as sodium metasilicate, sodium silicate, potassium metasilicate and potassium silicate; alkali metal carbonates such as sodium carbonate and potassium carbonate; alkali metal aluminates such as sodium aluminate and potassium aluminate; alkali metal aldonates such as sodium gluconate and potassium gluconate; and alkali metal hydrogenphosphates such as sodium secondary phosphate, potassium secondary phosphate, sodium tertiary phosphate and potassium tertiary phosphate. Of these, caustic alkali solutions and solutions containing both a caustic alkali and an alkali metal aluminate are preferred on account of the high etching rate and low cost. An aqueous solution of sodium hydroxide is especially preferred.

The concentration of the alkali solution may be set in accordance with the desired amount of etching, and is preferably 1 to 50 wt %, and more preferably 10 to 35 wt %. When aluminum ions are dissolved in the alkali solution, the concentration of the aluminum ions is preferably 0.01 to 10 wt %, and more preferably 3 to 8 wt %. The alkali solution preferably has a temperature of 20 to 90° C. The treatment time is preferably from 1 to 120 seconds.

Illustrative examples of methods for bringing the aluminum foil into contact with the alkali solution include a method in which the aluminum foil is passed through a tank filled with the alkali solution, a method in which the aluminum foil is immersed in a tank filled with the alkali solution, and a method in which the surface of the aluminum foil is sprayed with the alkali solution.

(Desmutting Treatment)

After electrolytic graining treatment or alkali etching treatment, it is preferable to carry out acid pickling (desmutting treatment) to remove contaminants (smut) remaining on the surface of the aluminum foil.

Examples of acids that may be used include nitric acid, sulfuric acid, phosphoric acid, chromic acid, hydrofluoric acid and tetrafluoroboric acid. Desmutting treatment is carried out by bringing the aluminum foil into contact with an acidic solution of, for example, hydrochloric acid, nitric acid or sulfuric acid having an acid concentration of 0.5 to 30 wt % and an aluminum ion concentration of 0.01 to 5 wt %. Exemplary methods for bringing the aluminum foil into contact with the acidic solution include passing the aluminum foil through a tank filled with the acidic solution, immersing the aluminum foil in a tank filled with the acidic solution, and spraying the acidic solution onto the surface of the aluminum foil. The acidic solution used in desmutting treatment may be the aqueous solution composed primarily of nitric acid or the aqueous solution composed primarily of hydrochloric acid that is discharged as wastewater from the above-described electrolytic graining treatment, or the aqueous solution composed primarily of sulfuric acid that is discharged as wastewater from the subsequently described anodizing treatment. The solution temperature in desmutting treatment is preferably from 25 to 90° C. The treatment time is preferably from 1 to 180 seconds. The acidic solution used in desmutting treatment may include aluminum and aluminum alloy components dissolved therein.

(Anodizing Treatment)

In the practice of the invention, the aluminum foil treated as described above may be optionally anodized in terms of preventing corrosion.

Anodizing treatment can be carried out by a commonly used method. In this case, an anodized film can be formed by passing a current through the aluminum foil as the anode in, for example, a solution having a sulfuric acid concentration of 50 to 300 g/L and an aluminum ion concentration of up to 5 wt %. Acids such as sulfuric acid, phosphoric acid, chromic acid, oxalic acid, sulfamic acid, benzenesulfonic acid and amidosulfonic acid may be used alone or in combination of two or more for the solution for use in anodizing treatment.

It is acceptable for ingredients ordinarily present in at least the aluminum foil, electrodes, tap water, ground water and the like to be present in the electrolytic solution. In addition, secondary and tertiary ingredients may be added. Here, "secondary and tertiary ingredients" include, for example, the ions of metals such as Na, K, Mg, Li, Ca, Ti, Al, V, Cr, Mn, Fe, Co, Ni, Cu and Zn; cations such as ammonium ion; and anions such as nitrate ion, carbonate ion, chloride ion, phosphate ion, fluoride ion, sulfite ion, titanate ion, silicate ion and borate ion. These may be present at concentrations of about 0 to 10,000 ppm.

The anodizing treatment conditions vary depending on the electrolytic solution used, and thus cannot be strictly specified. However, it is generally suitable for the solution to have an electrolyte concentration of 1 to 80 wt % and a temperature of 5 to 70° C., and for the current density to be 0.5 to 60 A/dm², the voltage to be 1 to 100 V, and the electrolysis time to be 15 seconds to 50 minutes. These conditions may be adjusted to obtain the desired anodized film weight.

Methods that may be used to carry out anodizing treatment include those described in JP 54-81133 A, JP 57-47894 A, JP 57-51289 A, JP 57-51290 A, JP 57-54300 A, JP 57-136596 A, JP 58-107498 A, JP 60-200256 A, JP 62-136596 A, JP 63-176494 A, JP 4-176897 A, JP 4-280997 A, JP 6-207299 A, JP 5-24377 A, JP 5-32083 A, JP 5-125597 A and JP 5-195291 A.

Of these, as described in JP 54-12853 A and JP 48-45303 A, it is preferable to use a sulfuric acid solution as the electrolytic solution. The electrolytic solution has a sulfuric acid concentration of preferably 10 to 300 g/L, and an aluminum ion concentration of preferably 1 to 25 g/L and more preferably 2 to 10 g/L. Such an electrolytic solution can be prepared by adding a compound such as aluminum sulfate to dilute sulfuric acid having a sulfuric acid concentration of 50 to 200 g/L.

When anodizing treatment is carried out in an electrolytic solution containing sulfuric acid, direct current or alternating current may be applied across the aluminum foil and the counter electrode. When a direct current is applied to the aluminum foil, the current density is preferably 1 to 60 A/dm$^2$, and more preferably 5 to 40 A/dm$^2$. To keep burnt deposits from arising on portions of the aluminum foil due to the concentration of current when anodizing treatment is carried out as a continuous process, it is preferable to apply current at a low density of 5 to 10 A/dm$^2$ at the start of anodizing treatment and to increase the current density to 30 to 50 A/dm$^2$ or more as anodizing treatment proceeds. When anodizing treatment is carried out as a continuous process, this is preferably done using a system that supplies power to the aluminum foil through the electrolytic solution.

The micropores in the anodized film generally have an average pore size of about 5 to about 50 nm and an average pore density of about 300 to about 800 pores/µm$^2$.

The weight of the anodized film is preferably 1 to 5 g/m$^2$. When the weight is less than 1 g/m$^2$, scratches are readily formed on the porous alumina support according to the invention. On the other hand, a weight in excess of 5 g/m$^2$ requires a large amount of electric power, which is economically disadvantageous. An anodized film weight of 1.5 to 4 g/m$^2$ is more preferred. It is also desirable for anodizing treatment to be carried out in such a way that the difference in the anodized film weight between the center of the aluminum foil and areas near the edges is not more than 1 g/m$^2$.

Figure 4:
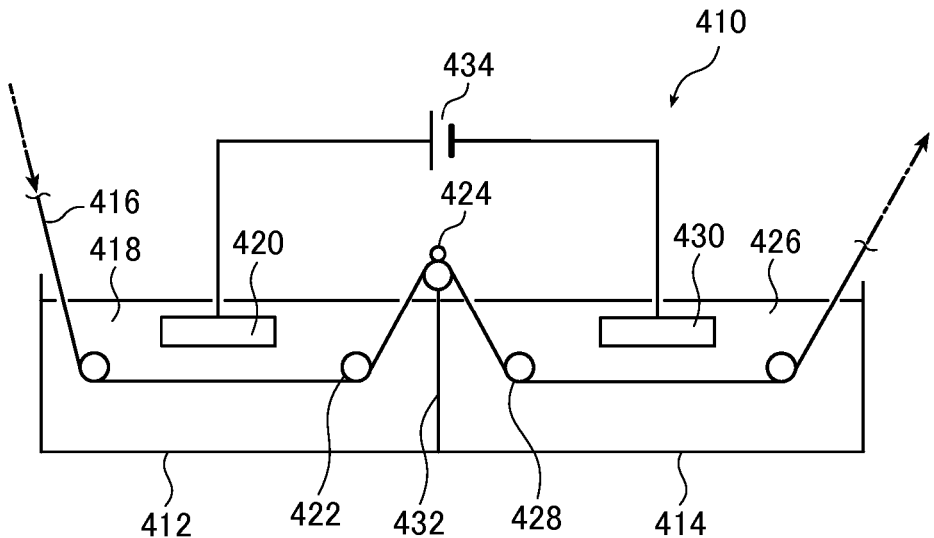
FIG. 4 is a schematic view showing an example of an anodizing apparatus that may be used to perform anodizing treatment in the manufacture of the aluminum base for a current collector according to the invention.

Examples of electrolysis apparatuses that may be used in anodizing treatment include those described in JP 48-26638 A, JP 47-18739 A and JP 58-24517 B. Of these, an apparatus like that shown in FIG. 4 is used with advantage. FIG. 4 is a schematic view showing an exemplary apparatus for anodizing the surface of aluminum foil. In an anodizing apparatus 410, aluminum foil 416 is transported as shown by arrows in FIG. 4. The aluminum foil 416 is positively (+) charged by a power supply electrode 420 in a power supply cell 412 containing an electrolytic solution 418. The aluminum foil 416 is then transported upward by a roller 422 disposed in the power supply cell 412, turned downward on a nip roller 424 and transported toward an electrolytic cell 414 containing an electrolytic solution 426 to be turned to a horizontal direction by a roller 428. Then, the aluminum foil 416 is negatively (−) charged by an electrolytic electrode 430 to form an anodized film on the foil surface. The aluminum foil 416 emerging from the electrolytic cell 414 is then transported to the section for the subsequent step. In the anodizing apparatus 410, the roller 422, the nip roller 424 and the roller 428 constitute direction changing means, and the aluminum foil 416 is transported through the power supply cell 412 and the electrolytic cell 414 in a mountain shape and a reversed U shape by means of these rollers 422, 424 and 428. The power supply electrode 420 and the electrolytic electrode 430 are connected to a DC power supply 434.

The characteristic feature of the anodizing apparatus 410 shown in FIG. 4 is that the aluminum foil 416 is transported in a mountain shape and a reversed U shape through the power supply cell 412 and the electrolytic cell 414 that are separated by a single cell wall 432. This configuration enables the length of the aluminum foil 416 held in the two cells to be the shortest. Therefore, the total length of the anodizing apparatus 410 can be shortened, thus enabling a decrease in equipment costs. Transport of the aluminum foil 416 in a mountain shape and a reversed U shape eliminates the necessity of forming an opening for passing the aluminum foil 416 through the cell wall 432 between the cells 412 and 414. The amount of electrolytic solution required for maintaining each of the liquid surfaces of the cells 412 and 414 at a necessary height can be thus suppressed to enable a decrease in running costs.

(Sealing Treatment)

In the practice of the invention, sealing treatment may be carried out as required to seal micropores in the anodized film. Sealing treatment may be carried out using any known method, illustrative examples of which include boiling water treatment, hot water treatment, steam treatment, sodium silicate treatment, nitrite treatment, and ammonium acetate treatment. Sealing treatment may be carried out by using the apparatuses and methods described in, for example, JP 56-12518 B, JP 4-4194 A, JP 5-202496 A and JP 5-179482 A.

(Rinsing Treatment)

In the practice of the invention, each of the aforementioned treatment steps is preferably followed by rinsing with water. Water that may be used in rinsing includes pure water, well water and tap water. A nipping device may also be used to prevent the treatment solution to be carried over to the next step.

[Current Collector]

The current collector of the invention is one including the above-described aluminum base of the invention and used in a positive electrode or a negative electrode.

According to the current collector of the invention, the aluminum base of the invention has the specific surface profile as described above, which increases the area of contact with the active material layer to enhance the adhesion, whereby a secondary battery having excellent cycle characteristics can be manufactured.

[Positive Electrode]

The positive electrode of the invention is a positive electrode including a positive electrode current collector using the above-described current collector of the invention for the positive electrode and a layer containing a positive electrode active material and formed on a surface of the positive electrode current collector (positive electrode active material layer).

A conventionally known active material may be used as the positive electrode active material but a material capable of storing and releasing lithium is preferred in terms of the use of the positive electrode of the invention in a secondary battery (in particular a lithium secondary battery).

It is preferred to use a lithium-containing compound as such a material, and specific examples thereof include a composite oxide containing lithium and a transition metal (hereinafter referred to as "lithium-transition metal composite oxide") and a phosphate compound containing lithium and a transition metal (hereinafter referred to as "lithium-containing transition metal phosphate compound"). Of these, a lithium-transition metal composite oxide is preferred.

Suitable examples of the transition metal making up the lithium-transition metal composite oxide include Ti, V, Cr, Mn, Fe, Co, Ni, Cu, Mo and W.

Alkali metals other than lithium (elements in Groups 1 (Ia) and 2 (IIa) of the periodic table), Al, Ga, In, Ge, Sn, Pb, Sb, Bi, Si, P and B may be mixed into the lithium-transition metal composite oxide in amounts of 0 to 30 mol % with respect to the transition metal used.

Of those lithium-transition metal composite oxides, one synthesized by mixing a lithium compound and a transition metal compound (the transition metal as used herein means at least one metal selected from the group consisting of Ti, V, Cr, Mn, Fe, Co, Ni, Cu, Mo and W) at a molar ratio of the lithium compound to the transition metal of 0.3 to 2.2 is more preferred.

Of those lithium-transition metal composite oxides, a material containing $Li_{g1}M3O_2$ (where M3 represents at least one element selected from the group consisting of Co, Ni, Fe and Mn; and g represents 0.02 to 1.2) and a material having a spinel structure represented by $Li_{h1}M4_2O$ (where M4 represents Mn; and h represents 0.1 to 2) are particularly preferred. M3 and M4 may include, for example, Al, Ga, In, Ge, Sn, Pb, Sb, Bi, Si, P and B in addition to the transition metals and these elements are preferably mixed in amounts of 0 to 30 mol % with respect to the transition metals.

Of those materials containing $Li_{g1}M3O_2$ and those materials having a spinel structure represented by $Li_{h1}M4_2O$, $Li_{g2}CoO_2$, $Li_{g2}NiO_2$, $Li_{g2}MnO_2$, $Li_{g2}CO_{j2}Ni_{1-j}O_2$, $Li_{h2}Mn_2O_4$, $LiNi_jMn_{1-j}O_2$, $LiCO_jNi_{h2}Al_{1-j-h2}O_2$, $LiCO_jNi_{h2}Mn_{1-j-h2}O_2$, $LiMn_{h2}Al_{2-h2}O_4$, and $LiMn_{h2}Ni_{2-h2}O_4$ (where g2 represents 0.02 to 1.2, j represents 0.1 to 0.9, and h2 represent 0.1 to 2) are particularly preferred. The values of g and h are values before starting charge and discharge, and increases with charge and decreases with discharge. Specific examples include $LiNi_{0.5}Mn_{0.5}O_2$, $LiNi_{0.85}Co_{0.01}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

On the other hand, suitable examples of the transition metal making up the lithium-containing transition metal phosphate compound include V, Ti, Cr, Mn, Fe, Co, Ni and Cu.

Specific examples of the lithium-containing transition metal phosphate compound include iron phosphates such as $LiFePO_4$, $Li_3Fe_2(PO_4)_3$ and $LiFeP_2O_7$; cobalt phosphates such as $LiCoPO_4$; these lithium transition metal phosphate compounds in which some of transition metal atoms serving as the main portion are substituted with, for example, Al, Ti, V, Cr, Mn, Fe, Co, Li, Ni, Cu, Zn, Mg, Ga, Zr, Nb or Si.

Of such positive electrode active materials, lithium cobaltate ($LiCoO_2$), $LiNi_{0.33}CO_{0.33}Mn_{0.33}O_2$ and iron phosphates are preferred because the adhesion to the positive electrode current collector can be enhanced to manufacture a secondary battery having more excellent cycle characteristics.

The average particle size of the positive electrode active material is not particularly limited and is preferably from 0.1 μm to 50 μm.

Conventionally known pulverizers and classifiers may be used to adjust the positive electrode active material to a predetermined particle size. For example, a mortar, a ball mill, a vibration ball mill, a vibration mill, a satellite ball mill, a planetary ball mill, a swirling air flow jet mill, and a sieve may be used.

The average particle size may be measured with a laser diffraction/scattering particle size distribution analyzer or the like from a sample dispersed in a liquid or air.

The specific surface area of the positive electrode active material is not particularly limited and the specific surface area as measured by the BET method is preferably from 0.01 $m^2/g$ to 50 $m^2/g$.

In addition, the supernatant obtained by dissolving 5 g of the positive electrode active material in 100 mL of distilled water preferably has a pH of at least 7 but not more than 12.

The positive electrode active material obtained by, for example, a firing method may be used after being washed with water, an acidic aqueous solution, an alkaline aqueous solution or an organic solvent.

In the practice of the invention, the active material layer may optionally contain other materials than the active material, as exemplified by a conductive material, a binding agent and a solvent.

The conductive material is not particularly limited as long as it is an electron-conductive material causing no chemical change in the formed secondary battery, and a known conductive material may be optionally used.

Examples of the conductive material include natural graphite (e.g., scaly graphite, flaky graphite, amorphous graphite), artificial graphite, carbon black, acetylene black, Ketjen black, carbon fiber, powdered metals (e.g., copper, nickel, aluminum and silver (described in JP 63-148554 A)), metal fiber, and polyphenylene derivatives (described in JP 59-20971 A). These may be used alone or in combination of two or more.

Of these, graphite is preferably used in combination with acetylene black.

The conductive material is preferably added in an amount of 1 to 50 wt % and more preferably 2 to 30 wt % of the positive electrode active material layer. In the case of carbon and graphite, they are most preferably added in amounts of 2 to 15 wt %.

Examples of the binding agent include polysaccharides, thermoplastic resins and polymers having rubber elasticity. Specific examples thereof include water-soluble polymers such as starch, carboxymethylcellulose, cellulose, diacetyl cellulose, methylcellulose, hydroxyethyl cellulose, hydroxypropyl cellulose, sodium alginate, polyacrylic acid, sodium polyacrylate, polyvinyl phenol, polyvinyl methyl ether, polyvinyl alcohol, polyvinylpyrrolidone, polyacrylonitrile, polyacrylamide, polyhydroxy (meth)acrylate, and styrene-maleic acid copolymer; polyvinyl chloride, polytetrafluoroethylene, polyvinylidene fluoride, tetrafluoroethylene-hexafluoropropylene copolymer, vinylidene fluoride-tetrafluoroethylene-hexafluoropropylene copolymer, polyethylene, polypropylene, ethylene-propylene-diene terpolymer (EPDM), sulfonated EPDM, polyvinyl acetal resin, (meth)acrylic acid ester copolymer containing (meth)acrylic acid ester such as methyl methacrylate or 2-ethylhexyl acrylate, (meth)acrylic acid ester-acrylonitrile copolymer, polyvinyl ester copolymer containing vinyl ester such as vinyl acetate; styrene-butadiene copolymer, acrylonitrile-butadiene copolymer, polybutadiene, neoprene rubber, fluororubber, polyethylene oxide, polyester polyurethane resin, polyether polyurethane resin, polycarbonate polyurethane resin, polyester resin, phenolic resin, and epoxy resin, in the form of emulsion (latex) or suspension. These may be used alone or in combination of two or more.

Of these, polyacrylic acid ester-based latex, carboxymethylcellulose, polytetrafluoroethylene, and polyvinylidene fluoride are preferred.

The binding agent is added in an amount of preferably 1 to 30 wt % and more preferably 2 to 10 wt % of the positive electrode active material layer in terms of the retention and agglomeration of the electrode mixture and the volume per unit volume or unit weight of the electrode.

Specific examples of the solvent include aprotic polar solvents such as N-methylpyrrolidone (NMP) and dimethyl sulfoxide (DMSO).

[Negative Electrode]

The negative electrode of the invention is a negative electrode including a negative electrode current collector using the above-described current collector of the invention for the negative electrode and a layer containing a negative electrode active material and formed on a surface of the negative electrode current collector.

The negative electrode active material is not particularly limited as long as lithium ions can be reversibly inserted and released. Specific examples thereof include metal oxides such as tin oxide and silicon oxide; metal composite oxides; metal sulfides; metal nitrides; lithium alloys such as a lithium-aluminum alloy; and metals such as Sn and Si capable of alloying with lithium. These may be used alone or in combination of two or more.

Of these, a substance which stores or releases lithium ions at a potential of at least 0.4 V with respect to the lithium metal potential is preferred.

The negative electrode active material having such a lithium ion-storing and releasing potential suppresses the alloying reaction between aluminum or an aluminum alloy and lithium and can be therefore used. Examples thereof include titanium oxide, lithium titanate, tungsten oxide, amorphous tin oxide, tin silicon oxide, and silicon oxide. Of these, lithium titanate is preferred.

[Secondary Battery]

The secondary battery of the invention is one having a positive electrode, a negative electrode and an electrolytic solution.

The configuration of the secondary battery of the invention is described below in detail with reference to FIGS. 5 and 6.

Figure 5:
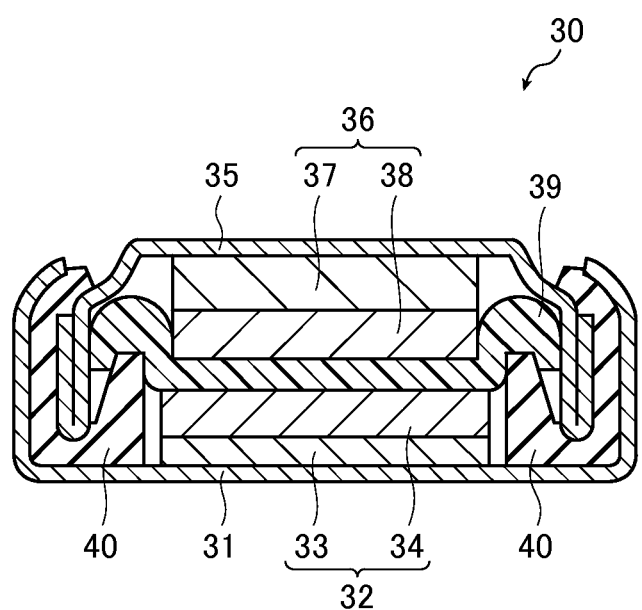
FIG. 5 is a schematic cross-sectional view showing an embodiment of a secondary battery of the invention.

FIG. 5 is a schematic cross-sectional view showing an embodiment of the secondary battery of the invention.

A secondary battery 30 shown in FIG. 5 is of a so-called coin type and a positive electrode 32 (including a positive electrode current collector 33 and a positive electrode active material layer 34) placed in an outer casing (case) 31 and a negative electrode 36 (including a negative electrode current collector 37 and a negative electrode active material layer 38) placed in an outer cap (sealing plate) 35 are stacked via a separator 39 containing an electrolytic solution.

The outer peripheries of the outer casing 31 and the outer cap 35 are hermetically sealed by caulking via an insulating gasket 40.

At least one of the positive electrode 32 and the negative electrode 36 is the positive electrode or the negative electrode of the invention, and the positive electrode current collector 33 and the positive electrode active material layer 34 making up the positive electrode 32 of the invention as well as the negative electrode current collector 37 and the negative electrode active material layer 38 making up the negative electrode 36 of the invention are as described above for the positive electrode and the negative electrode of the invention.

When one of the positive electrode 32 and the negative electrode 36 is the positive electrode or the negative electrode of the invention, the current collector and the active material layer making up the other electrode is not particularly limited in the invention and any conventionally known configuration may be used in both the cases.

The conventionally known negative electrode active material is not particularly limited as long as lithium ions can be reversibly inserted and released. For example, a carbonaceous material and elemental lithium may be used in addition to the above-described negative electrode active material for use in the negative electrode of the invention. These may be used alone or in combination of two or more.

Of these, a carbonaceous material, a metal oxide and a metal composite oxide are preferable in terms of safety.

The carbonaceous material for use as the negative electrode active material is a material substantially composed of carbon. Examples thereof include petroleum pitch, natural graphite; artificial graphite such as vapor-grown graphite; and carbonaceous materials obtained by firing various synthetic resins such as PAN resin and furfuryl alcohol resin. Further, use may be made of various carbon fibers such as PAN-based carbon fiber, cellulose-based carbon fiber, pitch-based carbon fiber, vapor-grown carbon fiber, dehydrated PVA-based carbon fiber, lignin carbon fiber, glassy carbon fiber and activated carbon fiber, mesophase microspheres, graphite whiskers, and plate-shaped graphite.

These carbonaceous materials can also be classified into hardly graphitized carbon materials and graphite-type carbon materials depending on the extent of graphitization. These carbonaceous materials preferably have such lattice spacing, density and crystal size as described in JP 62-22066 A, JP 2-6856 A and JP 3-45473 A. It is not necessary for the carbonaceous material to be a single substance and use may also be made of, for example, a mixture of natural graphite with artificial graphite as described in JP 5-90844 A or graphite having a covering layer as described in JP 6-4516 A.

An amorphous oxide is particularly preferred as the metal oxide and the metal composite oxide for use as the negative electrode active material. In addition, a chalcogenide which is a reaction product between a metal element and an element in Group 16 of the periodic table is also preferably used. The term "amorphous" as used herein means that a substance has a broad scattering band having a peak in a region of 20° to 40° in terms of a 2θ value in X-ray diffractometry using CuKα ray. It may have crystalline diffraction lines. The highest intensity of the crystalline diffraction lines observed at 40° to 70° in terms of a 2θ value is preferably not more than 100 times and more preferably not more than 5 times, as high as the diffraction line intensity at the peak of the broad scattering band observed at 20° to 40° in terms of a 2θ value. In the most desirable case, the compound shows no crystalline diffraction line.

The metal composite oxide is not particularly limited as long as it can store and release lithium. However, it is preferred to contain titanium and/or lithium as its constituents in terms of charge/discharge characteristics at high current density.

Of the compound group including the amorphous oxides and the chalcogenides, amorphous oxides and chalcogenides of metalloid elements are more preferred, and oxides and chalcogenides obtained by using elements in Groups 13 (IIIB) to 15 (VB) of the periodic table, including Al, Ga, Si, Sn, Ge, Pb, Sb and Bi singly or as a combination of two or more thereof are particularly preferred.

Preferred specific examples of the amorphous oxides and the chalcogenides include $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$. A composite oxide with lithium oxide such as $Li_2SnO_2$ may also be used.

The average particle size of the negative electrode active material is not particularly limited and is preferably from 0.1 μm to 60 μm.

Conventionally known pulverizers and classifiers may be used to adjust the negative electrode active material to a predetermined particle size. For example, a mortar, a ball mill, a sand mill, a vibration ball mill, a satellite ball mill, a planetary ball mill, a swirling air flow jet mill, and a sieve may be preferably used. Upon grinding, wet grinding in the presence of water or an organic solvent such as methanol may also be optionally performed. Classification is preferably performed to obtain a desired particle size. The classification method is not particularly limited and a sieve, an air classifier or the like may be optionally used. Both of dry classification and wet classification may be used.

Exemplary negative electrode active materials that may be preferably used in combination with the amorphous oxides for use as the negative electrode active materials which mainly contain Sn, Si or Ge include carbon materials capable of storing and releasing lithium ions or lithium metal, and lithium, lithium alloys and metals capable of alloying with lithium.

In the practice of the invention, the negative electrode active material layer may optionally contain other materials than the negative electrode active material, as exemplified by the above-described conductive aid, binding agent and solvent.

The separator 39 is also not particularly limited as long as it is made of a material having a sufficient mechanical strength to electronically isolate the positive electrode and the negative electrode from each other, ion permeability and resistance to oxidation and reduction at the surface of contact between the positive electrode and the negative electrode.

For example, porous polymer materials, inorganic materials, organic/inorganic hybrid materials and glass fiber may be used for such materials.

The separator preferably has the shutdown function for ensuring safety, that is, the function of closing voids at 80° C. or higher to increase the resistance, thereby interrupting the current, and the closing temperature is preferably at least 90° C. but not more than 180° C.

The pores of the separator is usually in a circular or elliptical shape and have a pore size of 0.05 µm to 30 µm and preferably 0.1 µm to 20 µm. In addition, the pores may be rod-shaped or amorphous as in cases where the separator is fabricated by drawing or phase separation. The ratio for which these voids account, that is, the porosity is from 20% to 90% and preferably from 35% to 80%.

As the polymer materials, materials such as polyethylene and polypropylene may be used singly or two or more composite materials may be used. A laminate including two or more types of microporous films which are different in, for example, pore size, porosity and pore closing temperature is preferable.

Use is made of inorganic materials including oxides such as alumina and silicon dioxide; nitrides such as aluminum nitride and silicon nitride; and sulfates such as barium sulfate and calcium sulfate. The inorganic materials used have a particle shape or a fiber shape. The separator used is in the form of non-woven cloth, woven cloth or a thin film such as a microporous film. In the shape of a thin film, a separator having a pore size of 0.01 µm to 1 µm and a thickness of 5 µm to 50 µm is used with advantage. In addition to the independent thin-film shape, use may be made of a separator including a porous composite layer containing particles of the inorganic material and formed on the surface layer of the positive electrode and/or the negative electrode with a resin binding agent. For example, alumina particles having a 90% particle size of less than 1 µm can be formed, as the porous layers, on both surfaces of the positive electrode using a fluororesin binding agent.

Examples of the organic solvent that may be used in the electrolytic solution for use in the invention include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyl oxazolidinone, N,N'-dimethylimidazolidinone, nitromethane, nitroethane, sulfolane, trimethyl phosphate, dimethyl sulfoxide, and dimethyl sulfoxide/phosphate. These may be used alone or in combination of two or more. Of these, at least one selected from the group consisting of ethylene carbonate, propylene carbonate, dimethyl carbonate, diethyl carbonate and ethyl methyl carbonate is preferred. In particular, a combination of a high-viscosity (high-dielectric constant) solvent (for example, having a relative permittivity $\in$ of 30 or more) such as ethylene carbonate or propylene carbonate with a low-viscosity solvent (for example, having a viscosity of up to 1 mPa·s) such as dimethyl carbonate, ethyl methyl carbonate or diethyl carbonate is more preferred because the dissociation ability and the ionic mobility of the electrolytic salt are improved.

However, the organic solvent (non-aqueous solvent) that may be used in the invention is not limited to those illustrated above.

In addition, the solvent may contain a cyclic carbonate ester having an unsaturated bond because the chemical stability of the electrolytic solution is further improved. For example, at least one selected from the group consisting of a vinylene carbonate compound, a vinyl ethylene carbonate compound, and a methylene ethylene carbonate compound is used as the cyclic carbonate ester having an unsaturated bond.

Examples of the vinylene carbonate compound include vinylene carbonate (1,3-dioxol-2-one), methyl vinylene carbonate (4-methyl-1,3-dioxol-2-one), ethyl vinylene carbonate (4-ethyl-1,3-dioxol-2-one), 4,5-dimethyl-1,3-dioxol-2-one, 4,5-diethyl-1,3-dioxol-2-one, 4-fluoro-1,3-dioxol-2-one, and 4-trifluoromethyl-1,3-dioxol-2-one.

Examples of the vinyl ethylene carbonate compound include vinyl ethylene carbonate (4-vinyl-1,3-dioxolan-2-one), 4-methyl-4-vinyl-1,3-dioxolan-2-one, 4-ethyl-4-vinyl-1,3-dioxolan-2-one, 4-n-propyl-4-vinyl-1,3-dioxolan-2-one, 5-methyl-4-vinyl-1,3-dioxolan-2-one, 4,4-divinyl-1,3-dioxolan-2-one, and 4,5-divinyl-1,3-dioxolan-2-one.

Examples of the methylene ethylene carbonate compound include 4-methylene-1,3-dioxolan-2-one, 4,4-dimethyl-5-methylene-1,3-dioxolan-2-one and 4,4-diethyl-5-methylene-1,3-dioxolan-2-one.

These may be used alone or as a mixture of two or more thereof. Of these, vinylene carbonate is preferable because a high effect is obtained.

The ion of a metal belonging to Group 1 or 2 of the periodic table or a salt thereof which is to be included in the electrolytic solution is selected as appropriate for the intended use of the electrolytic solution. Examples thereof include a lithium salt, a potassium salt, a sodium salt, a calcium salt and a magnesium salt. A lithium salt is preferred for use in the secondary battery and the like in terms of output power. When the electrolyte is used as the one of the non-aqueous electrolytic solution for a lithium secondary battery, the lithium salt need only be selected as a metal ion salt. The lithium salt is not particularly limited as long as it is commonly used as the electrolyte of the non-aqueous electrolytic solution for a lithium secondary battery. For example, the lithium salts described below are preferable.

(L-1) Inorganic lithium salts: inorganic fluoride salts such as $LiPF_6$, $LiBF_4$, $LiAsF_6$ and $LiSbF_6$; perhalogenates such as $LiClO_4$, $LiBrO_4$ and $LiIO_4$; and inorganic chloride salts such as $LiAlCl_4$.

(L-2) Fluorine-containing organic lithium salts: perfluoroalkane sulfonates such as $LiCF_3SO_3$; (perfluoroalkanesulfonyl)imide salts such as $LiN(CF_3SO_2)_2$, $LiN(CF_3CF_2SO_2)_2$, $LiN(FSO_2)_2$ and $LiN(CF_3SO_2)(C_4F_9SO_2)$; (perfluoroalkanesulfonyl)methide salts such as $LiC(CF_3SO_2)_3$; and (fluoroalkyl)fluorophosphates such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$ and $Li[PF_3(CF_2CF_2CF_2CF_3)_3]$.

(L-3) (Oxalato)borates: lithium bis(oxalato)borate and lithium difluoro(oxalato)borate.

Of these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$ and $LiN(Rf^1SO_2)(Rf^2SO_2)_2$ are preferred and $LiPF_6$, $LiBF_4$, $LiN(Rf^1SO_2)_2$, $LiN(FSO_2)_2$, $LiN(Rf^1SO_2)(Rf^2SO_2)_2$ and other lithium imide salts are more preferred. Here, $Rf^1$ and $Rf^2$ each represent a perfluoroalkyl group.

The lithium salts for use in the electrolytic solution may be used alone or in any combination of two or more thereof.

The ion of a metal belonging to Group 1 or 2 of the periodic table or the metal salt is added to the electrolytic solution in such an amount that the metal ion or the metal salt is contained at a preferred salt concentration to be mentioned below in the method for preparing the electrolytic solution. The salt concentration is selected as appropriate for the intended use of the electrolytic solution and is generally from 10 wt % to 50 wt % and more preferably from 15 wt % to 30 wt % with respect to the total weight of the electrolytic solution. When evaluated as the ionic concentration, the salt concentration need only be calculated in terms of the salt with an advantageously applied metal.

Next, a typical method for preparing the electrolytic solution is described below by reference to the case using a lithium salt as a metal ion salt.

The electrolytic solution is prepared by dissolving a silicon compound, a lithium salt and various additives added as desired in a solvent for the non-aqueous electrolytic solution.

The term "non-aqueous" as used in the invention means that water is substantially not contained, and a small amount of water may be contained as long as the effects of the invention are not impaired. In consideration of obtaining good properties, water is preferably contained in an amount of up to 200 ppm and more preferably up to 100 ppm. Although the lower limit is not particularly restricted, it is practical for the water content to be 10 ppm or more in consideration of inevitable incorporation.

The outer casing 31 and the outer cap 35 are also not particularly limited and may be made of, for example, stainless steel, aluminum or other metal.

Figure 6:
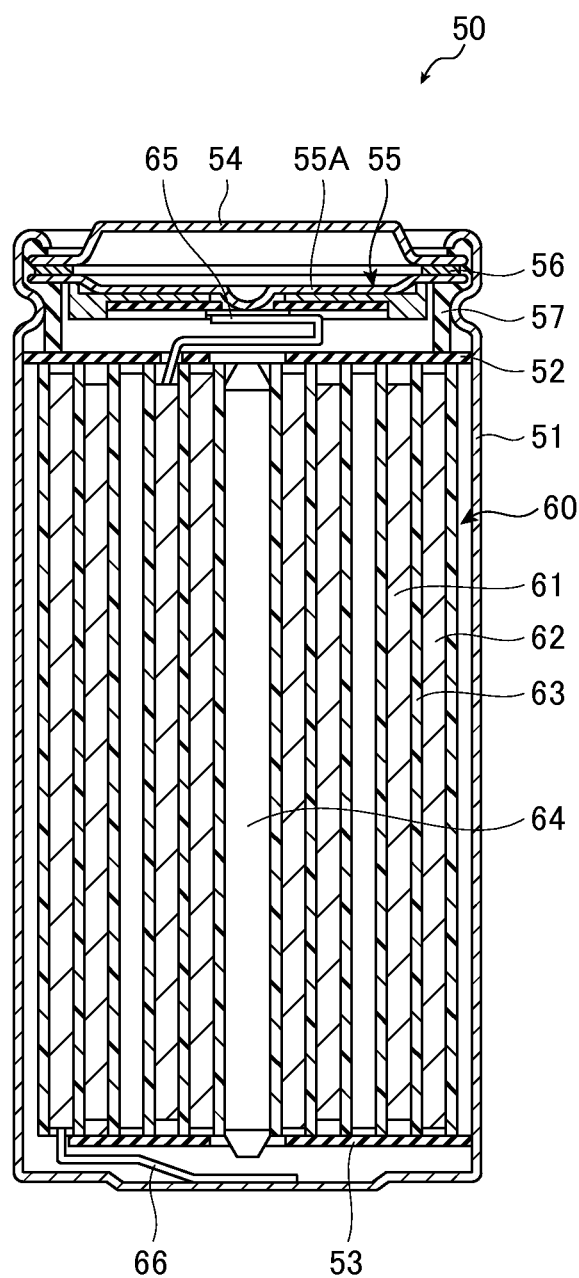
FIG. 6 is a schematic cross-sectional view showing another embodiment of the secondary battery of the invention.

FIG. 6 is a schematic cross-sectional view showing another embodiment of the secondary battery of the invention.

A secondary battery 50 shown in FIG. 6 is of a so-called cylinder type and a rolled electrode body 60 obtained by stacking a positive electrode 61 and a negative electrode 62 via a separator 63 containing an electrolytic solution and rolling them up and a pair of insulating plates 52 and 53 are placed inside a hollow cylindrical battery casing 51.

At least one of the positive electrode 61 and the negative electrode 62 is the positive electrode or the negative electrode of the invention, and the positive electrode current collector and the positive electrode active material layer making up the positive electrode 61 of the invention as well as the negative electrode current collector and the negative electrode active material layer making up the negative electrode 62 of the invention are as described above for the positive electrode and the negative electrode of the invention.

When one of the positive electrode 61 and the negative electrode 62 is the positive electrode or the negative electrode of the invention, the current collector and the active material layer making up the other electrode is not particularly limited in the invention and any conventionally known configuration may be used in both the cases.

The separator 63 is also not particularly limited and may be formed, for example, by the same method as that for the separator 39 shown in FIG. 5.

As shown in FIG. 6, a battery cover 54, and a safety valve mechanism 55 and a PTC (Positive Temperature Coefficient) device 56 provided inside the battery cover 54 are attached to the open end of the battery casing 51 by being caulked through a gasket 57. The interior of the battery casing 51 is thus hermetically sealed.

The battery cover 54 is, for example, made of a metallic material similar to that of the battery casing 51.

The safety valve mechanism 55 is electrically connected to the battery cover 54 through the PTC device 56.

In the safety valve mechanism 55, when the internal pressure of the battery becomes a certain level or more due to internal short circuit, external heating or the like, a disk plate 55A flips to cut the electrical connection between the battery cover 54 and the rolled electrode body 60.

The resistance of the PTC device 56 increases with increasing temperature to limit the current, thereby preventing abnormal heat generation due to a large current.

The gasket 57 is made of, for example, an insulating material and its surface is coated with asphalt.

A center pin 64 may be inserted in the center of the rolled electrode body 60.

In the rolled electrode body 60, a positive electrode lead 65 made of a metallic material such as aluminum is connected to the positive electrode 61, and a negative electrode lead 66 made of a metallic material such as nickel is connected to the negative electrode 62.

The positive electrode lead 65 is electrically connected to the battery cover 54 by being welded to the safety valve mechanism 55, and the negative electrode lead 66 is welded and electrically connected to the battery casing 51.

A secondary battery having good cycle characteristic and rate characteristics can be manufactured by including specific current collectors and therefore the secondary battery of the invention is used in various applications.

The secondary battery may be used in any application without particular limitation. When mounted on electronic instruments, the secondary battery can be used, for example, in applications such as notebook computers, stylus-operated personal computers, mobile personal computers, electronic book players, cellular phones, cordless extensions, pagers, handy terminals, portable facsimiles, portable copiers, portable printers, portable audio players, video movies, liquid crystal televisions, handy cleaners, portable CD players, MD players, electric shavers, transceivers, electronic organizers, calculators, portable tape recorders, radios, backup power supplies and memory cards. The secondary battery is also used in other commercial applications including automobiles, electric vehicles, motors, lighting apparatuses, toys, game consoles, road conditioners, watches, strobe cameras, cameras, and medical devices (pacemakers, hearing aids, shoulder massagers, etc.). The secondary battery can also be used for various purposes including military purposes and space purposes. The secondary battery can also be used in combination with a solar cell.

The metal ion that may be used for charge transport in the secondary battery of the invention is not particularly limited and it is preferable to use the ion of a metal belonging to Group 1 or 2 of the periodic table. In particular, ions such as lithium ion, sodium ion, magnesium ion, calcium ion and aluminum ion are preferably used. As for the general technical matters of secondary batteries using lithium ions, a lot of literatures and books including the references mentioned at the beginning of the specification are published and referenced therefor. In addition, Journal of Electrochemical Society; Electrochemical Science and Technology (US, 1980, Vol. 127, pp. 2097-2099) and the like can be referenced for the secondary battery using sodium ions. Nature 407, pp. 724-727 (2000) and the like can be referenced for magnesium ion. J. Electrochem. Soc., Vol. 138, 3536 (1991) and the like can be referenced for calcium ion. The invention is preferably applied to lithium ion secondary batteries because they are widely spread but the invention also has a desired effect on other articles than the lithium ion secondary batteries and should not be construed as being limited thereto.

EXAMPLES

The present invention is described below more specifically by way of examples. However, the present invention should not be construed as being limited to the following examples.

[Preparation of Aluminum Base for Current Collector]

Example 1-1

A surface of aluminum foil (JIS H-4160, aluminum purity: 99.30%) with a thickness of 20 μm and a width of 200 mm was subjected to the following surface treatments (a1) to (g1) to prepare an aluminum base for a current collector.

(a1) Electrochemical Graining Treatment (Formation of Large-Wave Structure)

First, electrochemical graining treatment was consecutively carried out using a DC voltage. The electrolytic solution was an aqueous solution containing 10.4 g/L of nitric acid and 4.5 g/L of aluminum ions, and had a temperature of 50° C. Electrochemical graining treatment was carried out using a carbon electrode as the counter electrode. Ferrite was used for the auxiliary anode. The electrolytic cell as shown in FIG. 3 was used. The current density at the current peak was 30 A/dm$^2$. The amount of electricity, which is the total amount of electricity when the aluminum foil serves as an anode, was 220 C/dm$^2$. To the auxiliary anode was diverted 5% of the current from the power supply. The aluminum foil was then rinsed by spraying with water.

(b1) Electrochemical Graining Treatment (Formation of Medium-Wave Structure)

Then, electrochemical graining treatment was consecutively carried out using a 60 Hz AC voltage. The electrolytic solution was an aqueous solution containing 9.2 g/L of nitric acid and 4.5 g/L of aluminum ions, and had a temperature of 50° C. The alternating current waveform was as shown in FIG. 2 and electrochemical graining treatment was carried out for a period of time TP until the current reached a peak from zero of 0.8 ms, at a duty ratio of 1:1, using an alternating current having a trapezoidal waveform, with a carbon electrode as the counter electrode. Ferrite was used for the auxiliary anode. The electrolytic cell as shown in FIG. 3 was used. The current density at the current peak was 25 A/dm$^2$. The amount of electricity, which is the total amount of electricity when the aluminum foil serves as an anode, was 185 C/dm$^2$. The aluminum foil was then rinsed by spraying with water.

(c1) Alkali Etching Treatment

Then, etching was carried out by spraying the aluminum foil with an aqueous solution having a sodium hydroxide concentration of 26 wt % and an aluminum ion concentration of 6.5 wt % at a temperature of 32° C., whereby 0.5 g/m$^2$ of material was dissolved out of the aluminum foil. Thus, the aluminum hydroxide-based smut component generated when electrochemical graining treatment was carried out using the alternating current in the previous step was removed, and edges of medium-wave structure portions formed by electrochemical graining treatment were dissolved and given smooth surfaces. The aluminum foil was then rinsed by spraying with water.

(d1) Desmutting Treatment

Then, desmutting treatment was carried out by spraying the aluminum foil with an aqueous solution having a sulfuric acid concentration of 25 wt % (aluminum ion content, 0.5 wt %) and a temperature of 60° C. for 10 seconds. The aluminum foil was then rinsed by spraying with water.

(e1) Electrochemical Graining Treatment (Formation of Small-Wave Structure)

Then, electrochemical graining treatment was consecutively carried out using a 60 Hz AC voltage. The electrolytic solution was an aqueous solution containing 8.2 g/L of hydrochloric acid and 4.5 g/L of aluminum ions, and had a temperature of 35° C. The alternating current waveform was as shown in FIG. 2 and electrochemical graining treatment was carried out for a period of time TP until the current reached a peak from zero of 0.8 ms, at a duty ratio of 1:1, using an alternating current having a trapezoidal waveform, with a carbon electrode as the counter electrode. Ferrite was used for the auxiliary anode. The electrolytic cell as shown in FIG. 3 was used. The current density at the current peak was 25 A/dm$^2$. The amount of electricity, which is the total amount of electricity when the aluminum foil serves as an anode, was 63 C/dm$^2$. The aluminum foil was then rinsed by spraying with water.

(f1) Alkali Etching Treatment

Then, etching was carried out by spraying the aluminum foil with an aqueous solution having a sodium hydroxide concentration of 26 wt % and an aluminum ion concentration of 6.5 wt % at a temperature of 32° C., whereby 0.1 g/m$^2$ of material was dissolved out of the aluminum foil. Thus, the aluminum hydroxide-based smut component generated when electrochemical graining treatment was carried out using the alternating current in the previous step was removed, and edges of small-wave structure portions formed by electrochemical graining treatment were dissolved and given smooth surfaces. The aluminum foil was then rinsed by spraying with water.

(g1) Desmutting Treatment

Then, desmutting treatment was carried out by spraying the aluminum foil with an aqueous solution having a sulfuric acid concentration of 25 wt % (aluminum ion content, 0.5 wt %) and a temperature of 60° C. for 10 seconds. The aluminum foil was then rinsed by spraying with water.

Example 1-2

The method of Example 1-1 was repeated except that the treatment (a1) was not performed and the treatments (b1)

and (c1) were replaced by electrolytic graining treatment (b2) and alkali etching treatment (c2) to be described below, thereby preparing an aluminum base for a current collector.

(b2) Electrochemical Graining Treatment (Formation of Medium-Wave Structure)

First, electrochemical graining treatment was consecutively carried out using a 60 Hz AC voltage. The electrolytic solution was an aqueous solution containing 10.2 g/L of nitric acid and 4.5 g/L of aluminum ions, and had a temperature of 33° C. The alternating current waveform was as shown in FIG. 2 and electrochemical graining treatment was carried out for a period of time TP until the current reached a peak from zero of 0.8 ms, at a duty ratio of 1:1, using an alternating current having a trapezoidal waveform, with a carbon electrode as the counter electrode. Ferrite was used for the auxiliary anode. The electrolytic cell as shown in FIG. 3 was used. The current density at the current peak was 25 A/dm$^2$. The amount of electricity, which is the total amount of electricity when the aluminum foil serves as an anode, was 245 C/dm$^2$. The aluminum foil was then rinsed by spraying with water.

(c2) Alkali Etching Treatment

Then, etching was carried out by spraying the aluminum foil with an aqueous solution having a sodium hydroxide concentration of 26 wt % and an aluminum ion concentration of 6.5 wt % at a temperature of 32° C., whereby 0.2 g/m$^2$ of material was dissolved out of the aluminum foil. Thus, the aluminum hydroxide-based smut component generated when electrochemical graining treatment was carried out using the alternating current in the previous step was removed, and edges of medium-wave structure portions formed by electrochemical graining treatment were dissolved and given smooth surfaces. The aluminum foil was then rinsed by spraying with water.

Example 1-3

The method of Example 1-1 was repeated except that electrolytic graining treatment (a2) to be described below was only performed instead of the treatments (a1) and (b1), thereby preparing an aluminum base for a current collector.

(a2) Electrolytic Graining Treatment (Formation of Large-Wave Structure and Medium-Wave Structure at a Time)

First, electrochemical graining treatment was consecutively carried out using a 60 Hz AC voltage. The electrolytic solution was an aqueous solution containing 10.2 g/L of nitric acid and 4.5 g/L of aluminum ions, and had a temperature of 33° C. The alternating current waveform was as shown in FIG. 2 and electrochemical graining treatment was carried out for a period of time TP until the current reached a peak from zero of 0.8 ms, at a duty ratio of 1:1, using an alternating current having a trapezoidal waveform, with a carbon electrode as the counter electrode. Ferrite was used for the auxiliary anode. The electrolytic cell as shown in FIG. 3 was used. The current density at the current peak was 30 A/dm$^2$. The amount of electricity, which is the total amount of electricity when the aluminum foil serves as an anode, was 612 C/dm$^2$. To the auxiliary anode was diverted 5% of the current from the power supply. The aluminum foil was then rinsed by spraying with water.

Example 1-4

The method of Example 1-1 was repeated except that the treatment (a1) was not performed and the treatments (b1) and (c1) were replaced by electrolytic graining treatment (b3) and alkali etching treatment (c3) to be described below, thereby preparing an aluminum base for a current collector.

(b3) Electrochemical Graining Treatment (Formation of Medium-Wave Structure)

First, electrochemical graining treatment was consecutively carried out using a 60 Hz AC voltage. The electrolytic solution was an aqueous solution containing 10.2 g/L of nitric acid and 4.5 g/L of aluminum ions, and had a temperature of 37° C. The alternating current waveform was as shown in FIG. 2 and electrochemical graining treatment was carried out for a period of time TP until the current reached a peak from zero of 0.8 ms, at a duty ratio of 1:1, using an alternating current having a trapezoidal waveform, with a carbon electrode as the counter electrode. Ferrite was used for the auxiliary anode. The electrolytic cell as shown in FIG. 3 was used. The current density at the current peak was 25 A/dm$^2$. The amount of electricity, which is the total amount of electricity when the aluminum foil serves as an anode, was 245 C/dm$^2$. The aluminum foil was then rinsed by spraying with water.

(c3) Alkali Etching Treatment

Then, etching was carried out by spraying the aluminum foil with an aqueous solution having a sodium hydroxide concentration of 26 wt % and an aluminum ion concentration of 6.5 wt % at a temperature of 32° C., whereby 0.1 g/m$^2$ of material was dissolved out of the aluminum foil. Thus, the aluminum hydroxide-based smut component generated when electrochemical graining treatment was carried out using the alternating current in the previous step was removed, and edges of medium-wave structure portions formed by electrochemical graining treatment were dissolved and given smooth surfaces. The aluminum foil was then rinsed by spraying with water.

Example 1-5

The method of Example 1-1 was repeated except that the treatment (a1) was not performed and the treatment (b1) was replaced by electrolytic graining treatment (b4) to be described below, thereby preparing an aluminum base for a current collector.

(b4) Electrochemical Graining Treatment (Formation of Medium-Wave Structure)

First, electrochemical graining treatment was consecutively carried out using a 60 Hz AC voltage. The electrolytic solution was an aqueous solution containing 10.2 g/L of nitric acid and 4.5 g/L of aluminum ions, and had a temperature of 50° C. The alternating current waveform was as shown in FIG. 2 and electrochemical graining treatment was carried out for a period of time TP until the current reached a peak from zero of 0.8 ms, at a duty ratio of 1:1, using an alternating current having a trapezoidal waveform, with a carbon electrode as the counter electrode. Ferrite was used for the auxiliary anode. The electrolytic cell as shown in FIG. 3 was used. The current density at the current peak was 25 A/dm$^2$. The amount of electricity, which is the total amount of electricity when the aluminum foil serves as an anode, was 245 C/dm$^2$. The aluminum foil was then rinsed by spraying with water.

Example 1-6

The method of Example 1-1 was repeated except that the respective treatments (b1) to (d1) were not performed and thus the medium-wave structure was not formed, thereby preparing an aluminum base for a current collector.

Example 1-7

The method of Example 1-1 was repeated except that the treatment (a1) was not performed and thus the large-wave structure was not formed, thereby preparing an aluminum base for a current collector.

Example 1-8

The method of Example 1-1 was repeated except that the respective treatments (e1) to (g1) were not performed and thus the small-wave structure was not formed, thereby preparing an aluminum base for a current collector.

Example 1-9

The method of Example 1-8 was repeated except that total amounts of electricity in the treatments (a1) and (b1) were changed to 80 C/dm$^2$ and 100 C/dm$^2$, respectively, thereby preparing an aluminum base for a current collector.

Comparative Example 1-1

The method of Example 1-1 was repeated except that the respective treatments (b1) to (g1) were not performed and thus the medium-wave structure and the small-wave structure were not formed, thereby preparing an aluminum base for a current collector.

Comparative Example 1-2

The method of Example 1-1 was repeated except that the respective treatments (a1) and (e1) to (g1) were not performed and thus the large-wave structure and the small-wave structure were not formed, thereby preparing an aluminum base for a current collector.

Comparative Example 1-3

The method of Example 1-1 was repeated except that the respective treatments (a1) to (d1) were not performed and thus the large-wave structure and the medium-wave structure were not formed, thereby preparing an aluminum base for a current collector.

Comparative Example 1-4

The method of Example 1-3 was repeated except that electrolytic graining treatment (a3) to be described below was only performed instead of the treatment (a2), thereby preparing an aluminum base for a current collector.

(a3) Electrolytic Graining Treatment (Formation of Large-Wave Structure and Medium-Wave Structure at a Time)

First, electrochemical graining treatment was consecutively carried out using a 60 Hz AC voltage. The electrolytic solution was an aqueous solution containing 10.2 g/L of nitric acid and 4.5 g/L of aluminum ions, and had a temperature of 33° C. The alternating current waveform was as shown in FIG. 2 and electrochemical graining treatment was carried out for a period of time TP until the current reached a peak from zero of 0.8 ms, at a duty ratio of 1:1, using an alternating current having a trapezoidal waveform, with a carbon electrode as the counter electrode. Ferrite was used for the auxiliary anode. The electrolytic cell as shown in FIG. 3 was used. The current density at the current peak was 30 A/dm$^2$. The amount of electricity, which is the total amount of electricity when the aluminum foil serves as an anode, was 415 C/dm$^2$. To the auxiliary anode was diverted 5% of the current from the power supply. The aluminum foil was then rinsed by spraying with water.

Comparative Example 1-5

Aluminum foil (JIS H-4160, aluminum purity: 99.30%) with a thickness of 20 μm and a width of 200 mm was directly used without any surface treatment.

[Measurement of Surface Profile of Aluminum Base for Current Collector]

The measurement of (1) to (3) described below was performed for the surface profile of the surface of each of the prepared aluminum bases for current collectors to calculate the average opening sizes of the large-wave structure, medium-wave structure and small-wave structure, respectively. The measurement of (4) described below was performed to calculate the maximum peak-to-valley height Pt of the profile curve.

The results are shown in Table 1. In Table 1, a dash "-" indicates that there were no wave structures having the defined average opening sizes.

(1) Average Opening Size of Large-Wave Structure

Two-dimensional roughness measurement was carried out using a stylus-type roughness tester (Surfcom 575 manufactured by Tokyo Seimitsu Co., Ltd.). The mean spacing between profile peaks $S_m$ as defined by ISO 4287 was measured five times, and the mean of the five measurements was used as the value of the average opening size.

The conditions of the two-dimensional roughness measurement were described below.

<Measurement Conditions>

Cutoff value, 0.8 mm;
slope correction, FLAT-ML;
measurement length, 3 mm;
vertical magnification, 10,000×;
scan rate, 0.3 mm/s;
stylus tip diameter, 2 μm.

(2) Average Opening Size of Medium-Wave Structure

The surface of the aluminum base was photographed from just above with a high-resolution scanning electron microscope (SEM) at a magnification of 2,000×. From the image obtained by the SEM, 50 pits (asperities) of the medium-wave structure which forms the annular periphery were selected and their diameter was read for the opening size. The average opening size was then calculated.

(3) Average Opening Size of Small-Wave Structure

The surface of the aluminum base was photographed from just above with a high-resolution scanning electron microscope (SEM) at a magnification of 50,000×. From the image obtained by the SEM, 50 pits (asperities) of the small-wave structure were selected and their diameter was read for the opening size. The average opening size was then calculated.

(4) Maximum Peak-to-Valley Height Pt of Profile Curve

The maximum peak-to-valley height Pt of the profile curve in the cross-section of each aluminum base was measured by a method defined by JIS B0601:2001.

<Measurement of Surface Area Ratio ΔS and Steep Area Ratio a45 of Aluminum Base for Current Collector>

The surface profile was measured with an atomic force microscope (SP13700 manufactured by Seiko Instruments & Electronics Ltd.) to obtain three-dimensional data, thereby determining the surface area ratio ΔS and the steep area ratio a45 on the surface of each of the prepared aluminum bases for current collectors. The procedure is described below in further detail.

A 1 cm square sample was cut out from the aluminum base and placed on a horizontal sample holder on a piezo scanner. A cantilever was made to approach the surface of the sample. When the cantilever reached the zone where interatomic forces were appreciable, the surface of the sample was scanned in the X and Y directions and the surface profile (wave structures) of the sample was read based on the displacement in the Z direction on the piezo scanner. The piezo scanner used was capable of scanning 150 μm in the X and Y directions and 10 μm in the Z direction. The cantilever used had a resonance frequency of 120 to 150 kHz and a spring constant of 12 to 20 N/m (SI-DF20 manufactured by NANOPROBE). Measurement was carried out in the dynamic force mode (DFM). The three-dimensional data obtained was approximated by the least-squares method to compensate for slight tilting of the sample and determine a reference plane.

Measurement involved obtaining values of 50 μm square regions on the surface of the sample at 512 by 512 points. The resolution was 1.9 μm in the X and Y directions, and 1 nm in the Z direction, and the scan rate was 60 μm/s.

The three-dimensional data (f(x,y)) obtained above was used to select sets of adjacent three points. The surface areas of microtriangles formed by the sets of three points were summated, thereby giving the actual area $S_x$. The surface area ratio ΔS was then calculated from the resulting actual area $S_x$ and the geometrically measured area $S_0$ using the equation (i).

The three-dimensional data (f(x,y)) obtained above is used to calculate for each reference point an angle formed between the reference plane and a microtriangle formed by three points including each reference point and its adjacent two points in predetermined directions (e.g., on the right side and the lower side). The number of reference points having a microtriangle inclination of 45° or more is divided by the total number of reference points (number obtained by subtracting the number of reference points having no adjacent two points in predetermined directions from the total data number (512×512), in short, 511×511) to calculate the area ratio a45 of the portions having an inclination of 45° or more.

The results are shown in Table 1.

TABLE 1

| | Average opening size (μm) | | | | | |
|---|---|---|---|---|---|---|
| | Large-wave structure | Medium-wave structure | Small-wave structure | Pt (μm) | ΔS (%) | a45 (%) |
| Example 1-1 | 21 | 2.6 | 0.08 | 5.4 | 53.9 | 13.3 |
| Example 1-2 | — | 2.5 | 0.09 | 3.5 | 52.4 | 12.7 |
| Example 1-3 | 18 | 2.5 | 0.08 | 6.7 | 53.0 | 21.7 |
| Example 1-4 | — | 2.0 | 0.08 | 3.0 | 61.1 | 11.8 |
| Example 1-5 | — | 1.5 | 0.08 | 2.8 | 61.3 | 11.4 |
| Example 1-6 | 22 | — | 0.08 | 5.8 | 48.0 | 19.0 |
| Example 1-7 | — | 2.6 | 0.08 | 3.3 | 45.0 | 14.1 |
| Example 1-8 | 23 | 2.7 | — | 5.7 | 20.0 | 18.0 |
| Example 1-9 | 8 | 0.8 | — | 0.5 | 11.0 | 4.0 |
| Comparative Example 1-1 | 24 | — | — | 5.1 | 12.0 | 12.3 |
| Comparative Example 1-2 | — | 2.7 | — | 3.1 | 14.5 | 12.2 |
| Comparative Example 1-3 | — | — | 0.08 | 0.4 | 8.5 | 12.9 |
| Comparative Example 1-4 | 6.0 | 2.0 | — | 20.0 | 53.0 | 16.0 |
| Comparative Example 1-5 | — | — | — | 0.1 | 1.3 | 0.2 |

<Preparation of Positive Electrode>

First, 200 g of lithium cobaltate (LiCoO$_2$) serving as a positive electrode active material, 2 g of acetylene black serving as a conductive aid, and 10 g of graphite were previously mixed to obtain a mixture.

Then, 212 g of the resulting mixture, 100 g of polyvinylidene fluoride (solid content: 8%) serving as a binding agent, and 20 g of N-methylpyrrolidone serving as a solvent were stirred by a Three-One Motor (rotational speed: 1,200 rpm). After stirring for 10 minutes, slurry adhering to the internal wall of the stirring bath was removed and stirring was further continued for 5 minutes.

Then, the resulting paste-like mixture was filtered through a mesh (SUS100) to prepare a material for the positive electrode active material layer.

The thus prepared material for the positive electrode active material layer was applied to the surface of each of the prepared aluminum bases for current collectors to a thickness of 70 μm and dried at a temperature of 100° C. for 30 minutes to prepare positive electrodes. The positive electrodes using the aluminum bases for current collectors prepared in Examples 1-1 to 1-9 were denoted by Positive Electrodes A to I, respectively, and the positive electrodes using the aluminum bases for current collectors prepared in Comparative Examples 1-1 to 1-5 were denoted by Positive Electrodes 1 to 5, respectively.

<Preparation of Negative Electrode A>

The same method as that for the material of the positive electrode active material layer was used except that the lithium cobaltate (positive electrode active material) was replaced by lithium titanate (negative electrode active material), thereby preparing a material for the negative electrode active material layer.

The thus prepared material for the negative electrode active material layer was applied to the surface of the aluminum base for a current collector prepared in Example 1-1 to a thickness of 70 μm and dried at a temperature of 100° C. for 30 minutes to prepare Negative Electrode A.

<Preparation of Negative Electrode 1>

First, 450 g of graphite serving as a negative electrode active material, 50 g of polyvinylidene fluoride (solid content: 8%) serving as a binding agent, and 500 g of N-methylpyrrolidone serving as a solvent were mixed to obtain a slurry. Then, the slurry was applied to one side of a copper foil current collector to a thickness of 70 μm and dried at a temperature of 100° C. for 30 minutes to prepare Negative Electrode 1.

<Preparation of Electrolytic Solution>

Ethylene carbonate (EC), dimethyl carbonate (DMC), methyl ethyl carbonate (MEC), 4-fluoroethylene carbonate (FEC) and vinylene carbonate (VC) were mixed at a weight ratio of ethylene carbonate:dimethyl carbonate:methyl ethyl carbonate:4-fluoroethylene carbonate:vinylene carbonate of 23:65:6:3:3 to obtain a solvent. Then, LiPF$_6$ as an electrolytic salt was further dissolved in the solvent and the resulting solution was used as the electrolytic solution. The electrolytic solution obtained by dissolving LiPF$_6$ to a molality of 1.5 mol/kg was used.

Preparation of Lithium Secondary Battery

Examples 2-1 to 2-11 and Comparative Examples 2-1 to 2-5

Each of Positive Electrodes A to I and 1 to 5 (see Table 2), a separator made of a microporous polypropylene film (25 μm in thickness) and the prepared Negative Electrode A or 1 (see Table 2) were stacked in this order to form a laminate. The laminate was rolled up many times in a spiral shape and an end portion of the rolled laminate was fixed with an adhesive tape to form a rolled electrode body.

Then, a nickel-plated iron battery casing was prepared. The rolled electrode body was then sandwiched between a pair of insulating plates. The negative electrode lead was welded to the battery casing and the positive electrode lead to the safety valve mechanism to place the rolled electrode body inside the battery casing.

Then, the prepared electrolytic solution was injected into the battery casing under reduced pressure to prepare a lithium secondary battery.

<Cycle Characteristics>

Charge and discharge were repeated in a bath at room temperature of 20° C. and the number of times (cycle number) required for the ratio of the discharge capacity maintained in the nth cycle to the discharge capacity in the 1st cycle to decrease below 80% was measured.

The results are shown in Table 2.

<Rate Characteristics>

For each of the prepared lithium secondary batteries, the discharge capacity at 5 C was measured after charging at a current density of 3.2 mA/cm$^2$ for 5 hours (0.2 C) and the ratio (%) of the maintained capacity to the discharge capacity as measured at 0.2 C was measured.

The results are shown in Table 2.

TABLE 2

|  | Positive electrode | Negative electrode | Cycle characteristics (cycle number) | Ratio of maintained capacity (%) |
| --- | --- | --- | --- | --- |
| Example 2-1 | Positive electrode A | Negative electrode 1 | 1500 | 90 |
| Example 2-2 | Positive electrode B | Negative electrode 1 | 800 | 60 |
| Example 2-3 | Positive electrode C | Negative electrode 1 | 1200 | 80 |
| Example 2-4 | Positive electrode D | Negative electrode 1 | 800 | 60 |
| Example 2-5 | Positive electrode E | Negative electrode 1 | 900 | 65 |
| Example 2-6 | Positive electrode F | Negative electrode 1 | 1000 | 80 |
| Example 2-7 | Positive electrode G | Negative electrode 1 | 900 | 65 |
| Example 2-8 | Positive electrode H | Negative electrode 1 | 1000 | 80 |
| Example 2-9 | Positive electrode I | Negative electrode 1 | 850 | 65 |
| Example 2-10 | Positive electrode 5 | Negative electrode A | 1500 | 90 |
| Example 2-11 | Positive electrode A | Negative electrode A | 2000 | 90 |
| Comparative Example 2-1 | Positive electrode 1 | Negative electrode 1 | 300 | 50 |
| Comparative Example 2-2 | Positive electrode 2 | Negative electrode 1 | 300 | 50 |
| Comparative Example 2-3 | Positive electrode 3 | Negative electrode 1 | 300 | 50 |
| Comparative Example 2-4 | Positive electrode 4 | Negative electrode 1 | 200 | 40 |
| Comparative Example 2-5 | Positive electrode 5 | Negative electrode 1 | 300 | 50 |

The results shown in Tables 1 and 2 revealed that the cycle characteristics and the rate characteristics cannot be improved by the use of aluminum bases each having only one of the large-wave structure, the medium-wave structure and the small-wave structure on the surface even in comparison with the case where the aluminum base for a current collector in Comparative Example 1-5 having undergone no surface treatment is used (Comparative Examples 2-1 to 2-3).

It was also revealed that, even if the aluminum base used has at least two of the large-wave structure, the medium-wave structure and the small-wave structure on its surface, the cycle characteristics and the rate characteristics are further deteriorated when the maximum peak-to-valley height Pt of the profile curve is more than 10 μm (Comparative Example 2-4).

In contrast, it was revealed that when the aluminum bases for current collectors each having at least two of the large-wave structure, the medium-wave structure and the small-wave structure on the surface are used, the cycle number increases about threefold to fivefold as compared to the case where the aluminum base for a current collector in Comparative Example 1-5 is used and the secondary batteries having excellent cycle characteristics can be prepared (Examples 2-1 to 2-11).

It was revealed that the secondary batteries also having excellent rate characteristics can be prepared by using the aluminum bases for current collectors each having the large-wave structure, the medium-wave structure and/or the small-wave structure on the surface (Examples 2-1, 2-3, 2-6, 2-8, 2-10 and 2-11).

In addition, the comparison between Examples 1-8 and 1-9 revealed that the cycle characteristics and the rate characteristics are good when the aluminum base for a current collector having a surface area ratio ΔS of at least 20% and a steep area ratio a45 of 5 to 60% is used (Examples 2-8 and 2-9).

It was also revealed that the cycle characteristics are extremely good when the aluminum base for a current collector prepared in Example 1-1 is used as the positive electrode and the negative electrode (Example 2-11).

What is claimed is:

1. An aluminum base for a current collector, comprising:
a surface in which at least two structures selected from the group consisting of a large-wave structure having an average opening size of more than 5 μm but up to 100 μm, a medium-wave structure having an average opening size of more than 0.5 μm but up to 5 μm, and a small-wave structure having an average opening size of more than 0.01 μm but up to 0.5 μm are superimposed on one another,
wherein each of the large-wave structure, the medium-wave structure, and the small-wave structure has alternating peaks and valleys of a continuously sinuous curve form and an overall profile of the at least two superimposed wave structures also has a continuously sinuous curve form; and,
a maximum peak-to-valley height Pt of a profile curve of the surface is up to 10 μm, wherein a peak-to-valley height is measured as the height from a top of a peak of the continuously sinuous curve form to a bottom of an adjacent valley of the continuously sinuous curve form.

2. An aluminum base for a current collector, comprising:
a surface in which at least two structures selected from the group consisting of a large-wave structure having an average opening size of more than 5 μm but up to 100 μm, a medium-wave structure having an average opening size of more than 0.5 μm but up to 5 μm, and a small-wave structure having an average opening size of more than 0.01 μm but up to 0.5 μm are superimposed on one another, wherein each of the large-wave structure, the medium-wave structure, and the small-wave structure has alternating peaks and valleys of a continuously sinuous curve form, and wherein the surface has a maximum peak-to-valley height Pt of a profile curve of up to 10 μm, wherein peak-to-valley height is measured as the height from a top of a peak of the continuously sinuous curve form to a bottom of an adjacent valley of the continuously sinuous curve form, and wherein a surface area ratio ΔS of 20% or more, and a steep area ratio a45 of 5 to 60%, given the surface area ratio ΔS being a value obtained by formula (i):

$$\Delta S = (S_x - S_0)/S_0 \times 100\ (\%) \tag{i}$$

where $S_x$ is an actual area of 50 μm square surface regions as determined by three-point approximation from three-dimensional data on the surface regions measured with an atomic force microscope at 512×512 points and $S_0$ is a geometrically measured area, and the steep area ratio a45 being an area ratio of portions inclined at an angle of 45° or more (having an inclination of 45° or more) to the actual area $S_x$.

3. The aluminum base for the current collector according to claim 1, having the surface in which at least the large-wave structure is formed.

4. The aluminum base for the current collector according to claim 2, having the surface in which at least the large-wave structure is formed.

5. The aluminum base for the current collector according to claim 1, having the surface in which the large-wave structure, and the medium-wave structure are superimposed on one another.

6. The aluminum base for the current collector according to claim 2, having the surface in which the large-wave structure, and the medium-wave structure are superimposed on one another.

7. The aluminum base for the current collector according to claim 1, having the surface in which the medium-wave structure and the small-wave structure are superimposed on one another.

8. The aluminum base for the current collector according to claim 2, having the surface in which the medium-wave structure and the small-wave structure are superimposed on one another.

9. The aluminum base for the current collector according to claim 1, having the surface in which all of the large-wave structure, the medium-wave structure and the small-wave structure are superimposed on one another.

10. The aluminum base for the current collector according to claim 2, having the surface in which all of the large-wave structure, the medium-wave structure and the small-wave structure are superimposed on one another.

11. The aluminum base for the current collector according to claim 1, having a thickness of less than 100 μm.

12. A current collector comprising: the aluminum base for the current collector according to claim 1, said current collector having an upper surface of continuously sinuous curve form.

13. A positive electrode comprising: a positive electrode current collector using the current collector according to claim 12 for the positive electrode and a layer containing a positive electrode active material, the positive electrode active material being formed on the continuously sinuous curve form of the upper surface of the positive electrode current collector.

14. The positive electrode according to claim 13, wherein the positive electrode active material is a material capable of storing and releasing lithium.

15. The positive electrode according to claim 13, wherein the positive electrode active material is a composite oxide containing lithium and a transition metal.

16. The positive electrode according to claim 15, wherein the positive electrode active material is lithium cobaltate ($LiCoO_2$).

17. A negative electrode comprising: a negative electrode current collector using the current collector according to claim 12 for the negative electrode and a layer containing a negative electrode active material, the negative electrode active material being formed on the continuously sinuous curve form of the upper surface of the negative electrode current collector.

18. The negative electrode according to claim 17, wherein the negative electrode active material is a material capable of storing and releasing lithium and having a lithium ion-storing and releasing potential of 0.4 V or more with respect to a lithium metal potential.

19. The negative electrode according to claim 18, wherein the negative electrode active material is lithium titanate.

20. A secondary battery comprising: a positive electrode, a negative electrode and an electrolyte, wherein the positive electrode is the positive electrode according to claim 13.

* * * * *